United States Patent
Zhu et al.

(10) Patent No.: US 11,805,350 B2
(45) Date of Patent: Oct. 31, 2023

(54) POINT-TO-MULTIPOINT DATA TRANSMISSION METHOD AND DEVICE

(71) Applicant: Huawei Technologies Co., Ltd., Shenzhen (CN)

(72) Inventors: Yuhong Zhu, Shanghai (CN); Liang Wang, Shanghai (CN); Yong Zheng, Shanghai (CN); Jingyun Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

(21) Appl. No.: 17/298,265

(22) PCT Filed: Nov. 30, 2018

(86) PCT No.: PCT/CN2018/118730
§ 371 (c)(1),
(2) Date: May 28, 2021

(87) PCT Pub. No.: WO2020/107466
PCT Pub. Date: Jun. 4, 2020

(65) Prior Publication Data
US 2021/0409856 A1 Dec. 30, 2021

(51) Int. Cl.
*H04R 1/10* (2006.01)
*H04R 5/033* (2006.01)
(Continued)

(52) U.S. Cl.
CPC .......... *H04R 1/1016* (2013.01); *G06F 3/165* (2013.01); *H04R 1/1041* (2013.01); *H04R 5/033* (2013.01);
(Continued)

(58) Field of Classification Search
CPC .... H04R 1/1016; H04R 1/1041; H04R 5/033; H04R 5/04; H04R 2201/107; H04R 2420/07; H04W 4/80; G06F 3/165
(Continued)

(56) References Cited

U.S. PATENT DOCUMENTS

| | | | |
|---|---|---|---|
| 7,894,863 B2 * | 2/2011 | Terai | H04M 1/6066 381/74 |
| 9,356,687 B2 | 5/2016 | Lee et al. | |

(Continued)

FOREIGN PATENT DOCUMENTS

| CN | 103856629 A | 6/2014 |
|---|---|---|
| CN | 104218976 A | 12/2014 |

(Continued)

OTHER PUBLICATIONS

"Bluetooth Core Specification," Bluetooth SIG Proprietary, v5 0, XP05556738, Dec. 6, 2016, 2822 pages.

*Primary Examiner* — Sean H Nguyen
(74) *Attorney, Agent, or Firm* — SLATER MATSIL, LLP

(57) ABSTRACT

A point-to-multipoint data transmission method and device, the method including a left earbud and a right earbud of a true wireless stereo (TWS) headset separately performing pairing and service content negotiation with an electronic device. The left earbud receives left configuration information sent by the electronic device, to configure a left ISO channel, and the right earbud receives right configuration information sent by the electronic device, to configure a right ISO channel. The left earbud receives, based on the BLE-based audio profile, audio data that is sent by the electronic device through the left ISO channel, and the right earbud receives, based on the BLE-based audio profile, the audio data that is sent by the electronic device through the right ISO channel. The left earbud and the right earbud play (Continued)

the respectively received audio data based on a first timestamp.

15 Claims, 10 Drawing Sheets

(51) Int. Cl.
*H04R 5/04* (2006.01)
*H04W 4/80* (2018.01)
*G06F 3/16* (2006.01)

(52) U.S. Cl.
CPC ............... *H04R 5/04* (2013.01); *H04W 4/80* (2018.02); *H04R 2201/107* (2013.01); *H04R 2420/07* (2013.01)

(58) Field of Classification Search
USPC ........................................................ 381/380
See application file for complete search history.

(56) References Cited

U.S. PATENT DOCUMENTS

| | | | |
|---|---|---|---|
| 10,080,075 | B2 | 9/2018 | Kang et al. |
| 10,271,152 | B1 | 4/2019 | Tong et al. |
| 2008/0152160 | A1* | 6/2008 | Chew .................. H04M 1/6066 |
| | | | 381/370 |
| 2014/0029701 | A1 | 1/2014 | Newham et al. |
| 2016/0080896 | A1 | 3/2016 | Song et al. |
| 2016/0299739 | A1 | 10/2016 | Song |
| 2016/0359925 | A1 | 12/2016 | Song |
| 2017/0244576 | A1 | 8/2017 | Batra et al. |
| 2017/0311073 | A1 | 10/2017 | Kang et al. |

FOREIGN PATENT DOCUMENTS

| | | |
|---|---|---|
| CN | 204204219 U | 3/2015 |
| CN | 107124674 A | 9/2017 |
| CN | 107306369 A | 10/2017 |
| CN | 108200495 A | 6/2018 |
| EP | 3644661 A1 | 4/2020 |
| WO | 2018053159 A1 | 3/2018 |

* cited by examiner

POINT-TO-MULTIPOINT DATA TRANSMISSION METHOD AND DEVICE

CROSS REFERENCE TO RELATED APPLICATIONS

This application is a National Stage of International Application No. PCT/CN2018/118730, filed Nov. 30, 2018, which is hereby incorporated by reference in its entirety.

TECHNICAL FIELD

This application relates to the field of short-range communications, and in particular, to a point-to-multipoint data transmission method and device.

BACKGROUND

Bluetooth (Bluetooth) is a wireless technology standard, which can implement short-distance data exchange between different devices. For example, a Bluetooth module on a mobile phone may be enabled for short-distance data exchange with a Bluetooth headset, to use the Bluetooth headset as an audio input/output device of the mobile phone to implement a call.

Today, Bluetooth is managed by the Bluetooth special interest group (Bluetooth special interest group, SIG), which is mainly responsible for formulating a Bluetooth technical specification. For example, the Bluetooth technical specification includes some audio profiles (profile), and the audio profiles are mainly used for point-to-point data transmission based on a basic rate (basic rate, BR)/an enhanced data rate (enhanced data rate, EDR).

With the advancement of science and technology, a true wireless stereo (true wireless stereo, TWS) headset gradually comes into people's sight. The TWS headset includes two headset bodies, for example, respectively referred to as a left earbud and a right earbud, and no cable connection is required between the left earbud and the right earbud. To use the TWS headset as an audio input/output device of a mobile phone, data needs to be transmitted between the mobile phone and the left and right earbuds of the TWS headset separately, and synchronization of audio data is required between the left and right earbuds of the TWS headset. It is clearly that the current formulated audio profiles cannot meet the requirements.

SUMMARY

Embodiments of this application provide a point-to-multipoint data transmission method and device. With Bluetooth, data is transmitted between a mobile phone and left and right earbuds of a TWS headset separately, and rendering synchronization of audio data between the left and right earbuds of the TWS headset is implemented.

The following technical solutions are used in this application.

According to a first aspect, this application provides a point-to-multipoint data transmission method. The method may be applied to a TWS headset, the TWS headset may include a first earbud and a second earbud, and the method may include: separately pairing up, by the first earbud and the second earbud, with an electronic device; separately performing, by the first earbud and the second earbud, service content negotiation with the electronic device, to obtain a service type supported by the electronic device, where the service type supported by the electronic device includes a BLE-based audio profile, and service types supported by the first earbud and the second earbud include the BLE-based audio profile; receiving, by the first earbud, first configuration information sent by the electronic device, where the first configuration information is used to configure a first ISO channel between the first earbud and the electronic device, and receiving, by the second earbud, second configuration information sent by the electronic device, where the second configuration information is used to configure a second ISO channel between the second earbud and the electronic device; receiving, by the first earbud based on the BLE-based audio profile, audio data that is sent by the electronic device through the first ISO channel, and receiving, by the second earbud based on the BLE-based audio profile, the audio data that is sent by the electronic device through the second ISO channel; and playing, by the first earbud and the second earbud, the respectively received audio data based on a first timestamp. The first earbud and the second earbud may be a left earbud and a right earbud respectively.

By using the technical solution, the audio data is transmitted between the electronic device and the left and right earbuds of the TWS headset based on the BLE-based audio profile, thereby implementing point-to-multipoint data transmission. In addition, the electronic device respectively transmits the audio data to the left and right earbuds of the TWS headset through the ISO channels, thereby implementing rendering synchronization of point-to-multipoint audio data, that is, rendering synchronization in user perception of the audio data respectively transmitted by the electronic device to the left and right earbuds of the TWS headset.

In a possible implementation, the method may further include: setting up, by the first earbud, a first ACL link to the electronic device; and the receiving, by the first earbud, first configuration information sent by the electronic device may include: receiving, by the first earbud, the first configuration information that is sent by the electronic device over the first ACL link. The method may further include: setting up, by the second earbud, a second ACL link to the electronic device; and the receiving, by the second earbud, second configuration information sent by the electronic device may include: receiving, by the second earbud, the second configuration information that is sent by the electronic device over the second ACL link.

In another possible implementation, the method may further include: receiving, by the first earbud based on the BLE-based audio profile, control data that is sent by the electronic device over the first ACL link, and receiving, by the second earbud based on the BLE-based audio profile, the control data that is sent by the electronic device over the second ACL link; and responding, by the first earbud and the second earbud, to the respectively received control data based on a second time stamp. In this way, with the audio profile supporting BLE, synchronization of point-to-multipoint control data, that is, synchronization in user perception of the control data respectively transmitted by the electronic device to the left and right earbuds of the TWS headset, can also be implemented. For example, when the TWS headset is used as an audio output device of a mobile phone to play music, for a user, the mobile phone can ensure that the left and right earbuds of the TWS headset synchronously play and pause.

In another possible implementation, the receiving, by the first earbud based on the BLE-based audio profile, audio data that is sent by the electronic device through the first ISO channel may include: receiving, by the first earbud based on the BLE-based audio profile, a first packet that is sent by the electronic device through the first ISO channel, where the first packet may include a first payload payload, and the first payload includes the audio data and the first timestamp; and the receiving, by the second earbud based on the BLE-based audio profile, the audio data that is sent by the electronic device through the second ISO channel may include: receiving, by the second earbud based on the BLE-based audio profile, the first packet that is sent by the electronic device through the second ISO channel. In this way, the left and right earbuds of the TWS headset can implement rendering synchronization of the audio data based on the first timestamp.

In another possible implementation, the receiving, by the first earbud based on the BLE-based audio profile, control data that is sent by the electronic device over the first ACL link may include: receiving, by the first earbud based on the BLE-based audio profile, a second packet that is sent by the electronic device over the first ACL link, where the second packet includes a second payload, and the second payload includes the control data and the second time stamp; and the receiving, by the second earbud based on the BLE-based audio profile, the control data that is sent by the electronic device over the second ACL link may include: receiving, by the second earbud based on the BLE-based audio profile, the second packet that is sent by the electronic device over the second ACL link. In this way, the left and right earbuds of the TWS headset can implement synchronization of the control data based on the second timestamp.

According to a second aspect, this application provides a point-to-multipoint data transmission method. The method may be applied to an electronic device, and the method may include: separately pairing up, by the electronic device, with a first earbud and a second earbud of a TWS headset; separately performing, by the electronic device, service content negotiation with the first earbud and the second earbud, to obtain service types supported by the first earbud and the second earbud, where the service types supported by the first earbud and the second earbud include a BLE-based audio profile, and a service type supported by the electronic device includes the BLE-based audio profile; sending, by the electronic device, first configuration information to the first earbud, where the first configuration information is used to configure a first ISO channel between the electronic device and the first earbud, and sending, by the electronic device, second configuration information to the second earbud, where the second configuration information is used to configure a second ISO channel between the electronic device and the second earbud; and sending, by the electronic device based on the BLE-based audio profile, audio data to the first earbud through the first ISO channel, and sending the audio data to the second earbud through the second ISO channel.

By using the technical solution, the audio data is transmitted between the electronic device and the left and right earbuds of the TWS headset based on the BLE-based audio profile, thereby implementing point-to-multipoint data transmission. In addition, the electronic device respectively transmits the audio data to the left and right earbuds of the TWS headset through the ISO channels, thereby implementing rendering synchronization of point-to-multipoint audio data, that is, rendering synchronization in user perception of the audio data respectively transmitted by the electronic device to the left and right earbuds of the TWS headset.

In a possible implementation, the method may further include: setting up, by the electronic device, a first ACL link to the first earbud; and the sending, by the electronic device, first configuration information to the first earbud may include: sending, by the electronic device, the first configuration information to the first earbud over the first ACL link. The method may further include: setting up, by the electronic device, a second ACL link to the second earbud; and the sending, by the electronic device, second configuration information to the second earbud may include: sending, by the electronic device, the second configuration information to the second earbud over the second ACL link.

In another possible implementation, the method may further include: sending, by the electronic device based on the BLE-based audio profile, control data to the first earbud over the first ACL link, and sending the control data to the second earbud over the second ACL link. In this way, with the audio profile supporting BLE, synchronization of point-to-multipoint control data, that is, synchronization in user perception of the control data respectively transmitted by the electronic device to the left and right earbuds of the TWS headset, can also be implemented.

In another possible implementation, the sending, by the electronic device based on the BLE-based audio profile, audio data to the first earbud through the first ISO channel, and sending the audio data to the second earbud through the second ISO channel may include: encoding, by the electronic device, the audio data based on the BLE-based audio profile to generate a first packet, where the first packet includes a first payload payload, the first payload includes the audio data and a first timestamp, and the first timestamp is used for the first earbud and the second earbud to implement rendering synchronization of the audio data; sending, by the electronic device, the first packet to the first earbud through the first ISO channel; and sending, by the electronic device, the first packet to the second earbud through the second ISO channel. In this way, the left and right earbuds of the TWS headset can implement rendering synchronization of the audio data based on the first timestamp.

In another possible implementation, the sending, by the electronic device based on the BLE-based audio profile, control data to the first earbud over the first ACL link, and sending the control data to the second earbud over the second ACL link may include: encoding, by the electronic device, the control data based on the BLE-based audio profile to generate a second packet, where the second packet includes a second payload, the second payload includes the control data and a second time stamp, and the second time stamp is used for the first earbud and the second earbud to implement synchronization of the control data; sending, by the electronic device, the second packet to the first earbud over the first ACL link; and sending, by the electronic device, the second packet to the second earbud over the second ACL link. In this way, the left and right earbuds of the TWS headset can implement synchronization of the control data based on the second timestamp.

According to a third aspect, this application provides a TWS headset. The TWS headset may include a first earbud and a second earbud. The first earbud and the second earbud may each include a processor, a memory, a wireless communications module, a receiver, and a microphone. The memory, the wireless communications module, the receiver, and the microphone are coupled to the processor, the memory is configured to store computer program code, and the computer program code includes computer instructions. When the processor of the first earbud executes the computer instructions stored in the memory of the first earbud, the first earbud performs the point-to-multipoint data transmission method according to any one of the first aspect or the possible implementations of the first aspect. When the processor of the second earbud executes the computer instructions stored in the processor of the second earbud, the second earbud performs the point-to-multipoint data transmission method according to any one of the first aspect or the possible implementations of the first aspect.

According to a fourth aspect, this application provides an electronic device, which may include: one or more processors, a memory, a wireless communications module, and a mobile communications module. The memory, the wireless communications module, and the mobile communications module are coupled to the one or more processors, the memory is configured to store computer program code, and the computer program code includes computer instructions. When the one or more processors execute the computer instructions, the electronic device performs the point-to-multipoint data transmission method according to any one of the second aspect or the possible implementations of the second aspect.

According to a fifth aspect, a Bluetooth communications system is provided. The Bluetooth communications system may include the TWS headset according to the third aspect and the electronic device according to the fourth aspect.

According to a sixth aspect, a Bluetooth chip is provided. The Bluetooth chip may include an audio transmission framework, and the audio transmission framework may include a BLE-based audio profile, a dual device manager DDM, an isochronous channel manager ICM, and a direct audio data path DADP. The ICM may be configured to establish an isochronous ISO channel. The DDM may be configured to transmit audio data on the ISO channel based on the BLE-based audio profile. The DADP may be configured to encode or decode the audio data transmitted on the ISO channel.

In a possible implementation, the ICM may be further configured to reconfigure or delete the ISO channel.

In another possible implementation, the DDM may be further configured to manage a related procedure of point-to-multipoint data transmission between an electronic device and a TWS headset. For example, the related procedure may include: a pairing connection procedure between the electronic device and the TWS headset, a primary-secondary switchover procedure (or referred to as a role switchover procedure), an audio capability declaration and discovery procedure, an audio data configuration procedure, a device scheduling and coordination procedure, an encoder parameter negotiation procedure, a state machine management procedure, a transmission configuration parameter negotiation procedure, and a content control management procedure.

The ICM may be further configured to provide the DDM with all management methods for a data transmission related procedure, for example, defining a specific command and response, and providing an interface for the DDM to use.

The DADP may be further configured to perform processing such as data distribution, data collection, and synchronous playing of the audio data transmitted on the ISO channel.

According to a seventh aspect, a computer storage medium is provided, including computer instructions. When the computer instructions run on a first earbud of a TWS headset, the first earbud is enabled to perform the point-to-multipoint data transmission method according to any one of the first aspect or the possible implementations of the first aspect. When the computer instructions run on a second earbud of the TWS headset, the second earbud is enabled to perform the point-to-multipoint data transmission method according to any one of the first aspect or the possible implementations of the first aspect.

According to an eighth aspect, a computer storage medium is provided, including computer instructions. When the computer instructions run on an electronic device, the electronic device is enabled to perform the point-to-multipoint data transmission method according to any one of the second aspect or the possible implementations of the second aspect.

According to a ninth aspect, this application provides a computer program product. When the computer program product runs on a computer, the computer is enabled to perform either of the point-to-multipoint data transmission methods.

It may be understood that the TWS headset according to the third aspect, the electronic device according to the fourth aspect, the Bluetooth communications system according to the fifth aspect, the Bluetooth chip according to the sixth aspect, the computer storage media according to the seventh aspect and the eighth aspect, and the computer program product according to the ninth aspect that are provided above are all configured to perform corresponding methods provided above. Therefore, for beneficial effects that can be achieved, refer to beneficial effects in the corresponding methods provided above. Details are not described herein again.

DETAILED DESCRIPTION OF ILLUSTRATIVE EMBODIMENTS

Figure 1:
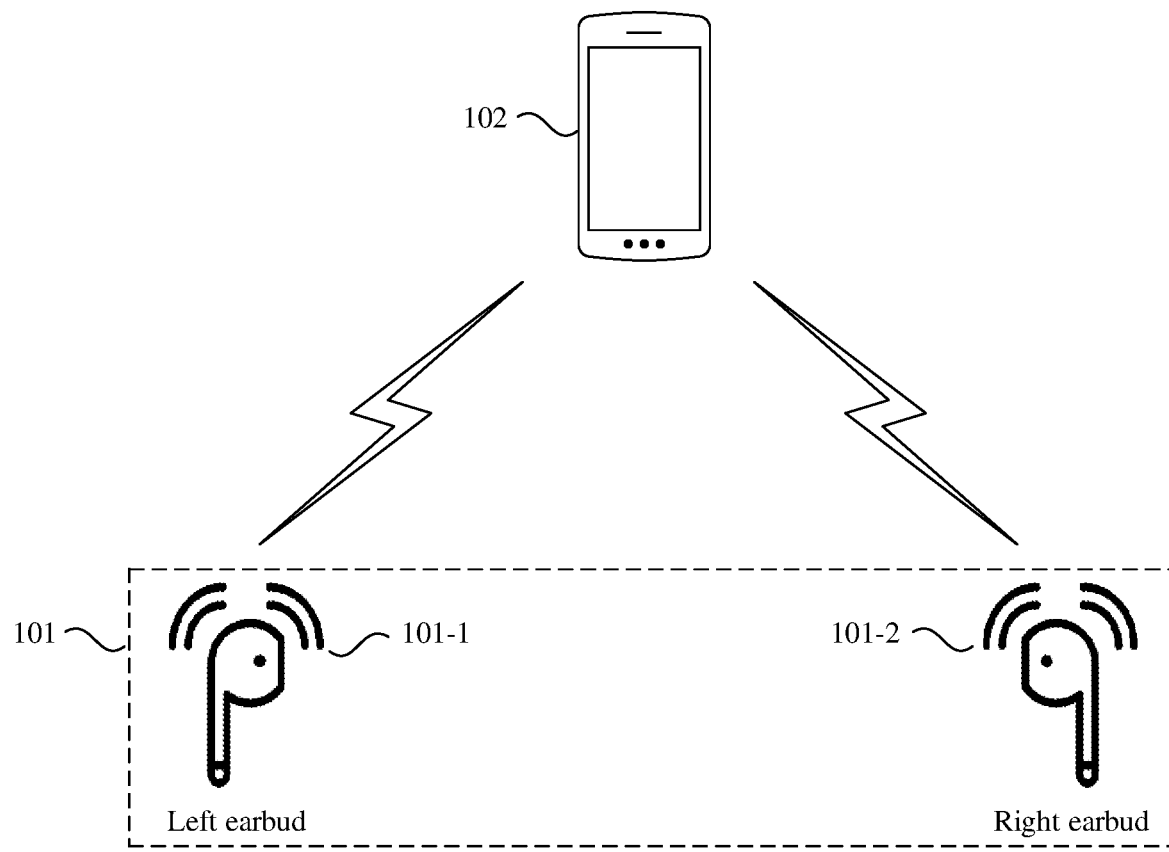
FIG. 1 is a schematic architectural diagram of a Bluetooth audio system according to an embodiment of this application.

Currently, the Bluetooth technical specification formulated by the SIG includes some audio profiles, for example, a hands-free profile (hands free profile, HFP), an advanced audio distribution profile (advanced audio distribution profile, A2DP), and an audio/video remote control profile (audio/video remote control profile, AVRCP).

The HFP is a Bluetooth telephony service protocol. Some extended functions are added to the HFP based on a headset profile (Head Set Profile, HSP), to enable a vehicle-mounted hands-free apparatus to control a mobile phone, for example, answering a call, hanging up a call, rejecting an incoming call, and voice dialing. The HFP may also be used in a scenario in which a personal computer is used as an output device, such as a speaker, of a mobile phone. The HSP is a most common Bluetooth configuration and can provide a basic function required for communication between a mobile phone and a Bluetooth headset. Based on the HSP, the Bluetooth headset may be used as an audio input/output device of the mobile phone.

The A2DP is a Bluetooth audio application protocol, which specifies a method of stacking data by using a chip in a headset. Based on the A2DP, stereo audio data such as high-quality music can be transmitted between two Bluetooth devices in a Bluetooth mode to achieve high-definition sounds.

The AVRCP is a Bluetooth audio remote audio control protocol, used to send control data (or referred to as control commands) such as forward, backward, pause, and play from a controller (such as a stereo headset) to a target device (such as a mobile phone with a music player installed). In the AVRCP, the controller may convert detected user operations into audio/video (audio/video, A/V) control data and then transmit the control data to the target device to control the target device. The AVRCP can be used in cooperation with the A2DP.

The audio profiles such as the HFP, the A2DP, and the AVRCP are mainly used for point-to-point data transmission based on a BR/an EDR.

An embodiment of this application provides a point-to-multipoint data transmission method. A BR/EDR-based audio profile such as the A2DP, the HFP, or the AVRCP is modified to an audio profile supporting Bluetooth low energy (Bluetooth low energy, BLE), to implement point-to-multipoint data transmission. In addition, audio data is transmitted based on an isochronous (isochronous, ISO) channel (channel) of BLE, thereby implementing rendering synchronization of point-to-multipoint audio data, that is, rendering synchronization of audio data respectively transmitted by a mobile phone to left and right earbuds of a TWS headset.

The ISO channel of BLE defines a transmission mechanism. In this embodiment of this application, with the transmission mechanism, a source device may send a data stream (stream, for example, audio data) to a plurality of destination devices based on ISO channels of BLE, and rendering synchronization of the data stream between the plurality of destination devices can be implemented.

In this embodiment of this application, the rendering synchronization of the data stream between the plurality of destination devices may mean that the plurality of destination devices may separately receive the data stream from the source device, and for a user, received data streams can be played at a same time point. For example, the source device may be a mobile phone, and the plurality of destination devices may be left and right earbuds of a TWS headset. When the TWS headset is used as an audio input/output device of the mobile phone, the mobile phone may respectively send audio data to the left and right earbuds of the TWS headset based on ISO channels of BLE by using an audio profile supporting BLE. After receiving the audio data from the mobile phone, the left and right earbuds of the TWS headset can play the received audio data at a same time point perceived by the user. In this way, rendering synchronization of point-to-multipoint audio data is implemented.

It should be noted that in this embodiment of this application, the audio data (which may also be referred to as an audio stream) may include voice data in a call process, voice data or a voice message in a voice call or video call process performed by using an application (such as WeChat (WeChat) or Facebook (Facebook)), an announcement (such as an incoming call announcement or a ringback tone), music, and the like.

In addition, when the TWS headset is used as an input/output device of the mobile phone, in addition to a need to transmit the audio data, there may be a need to transmit control data between the mobile phone and the left and right earbuds of the TWS headset. The control data (which may also be referred to as a control command, content (content) control, or the like) may include media control (media control), call control (call control), volume control (volume control), and the like. The media control may include commands such as pause and play. The call control may include commands such as answering an incoming call, hanging up a call, rejecting an incoming call, voice dialing, holding a call, and callback. The volume control may include commands such as volume down and volume up.

Similar to rendering synchronization of audio data, in this embodiment of this application, with the audio profile supporting BLE, synchronization of point-to-multipoint control data, that is, synchronization of the control data respectively transmitted by the mobile phone to the left and right earbuds of the TWS headset, can also be implemented. The control data may be transmitted over an asynchronous connection-oriented link (asynchronous connection-oriented link, ACL). The synchronization of the control data may mean that the left and right earbuds of the TWS headset may separately receive the control data from the mobile phone, and for the user, corresponding responses can be made to the control data at a same time point. In other words, the mobile phone can ensure synchronization between the left and right earbuds of the TWS headset when the corresponding control data is executed. For example, when the TWS headset is used as an audio output device of the mobile phone to play music, for the user, the mobile phone can ensure that the left and right earbuds of the TWS headset synchronously play and pause.

The following describes the implementations of the embodiments of this application in detail with reference to accompanying drawings.

As shown in FIG. 1, the point-to-multipoint data transmission method provided in the embodiments of this application may be applied to a Bluetooth audio system including a peripheral device 101 and an electronic device 102.

A Bluetooth connection may be established between the peripheral device 101 and the electronic device 102 by using Bluetooth. Based on the established Bluetooth connection, short-distance data exchange may be implemented between the peripheral device 101 and the electronic device 102. For example, audio data may be transmitted between the peripheral device 101 and the electronic device 102 based on the Bluetooth connection. For example, based on the Bluetooth connection, the peripheral device 101 may be used as an audio input/output device of the electronic device 102 to implement a call. For another example, based on the Bluetooth connection, the peripheral device 101 may be used as an output device, such as a speaker, of the electronic device 102, to play music.

In some embodiments, the peripheral device 101 may be a device such as a TWS headset, a Bluetooth speaker, or smart glasses. The peripheral device 101 includes two bodies, and no cable connection is required between the two bodies. In addition, for audio data transmitted by the electronic device 102 to the two bodies of the peripheral device 101, the two bodies are required to implement rendering synchronization of the audio data.

In this embodiment of this application, a specific manner in which a Bluetooth connection is established between the peripheral device 101 and the electronic device 102 by using Bluetooth may be that the electronic device 102 respectively establishes Bluetooth connections to the two bodies of the peripheral device 101. Short-distance data exchange may be respectively implemented between the electronic device 102 and the two bodies of the peripheral device 101 based on the respective Bluetooth connections. In an example, FIG. 1 shows a TWS headset as an example of the peripheral device 101. The TWS headset includes two bodies (for example, headset bodies), for example, referred to as a left earbud 101-1 and a right earbud 101-2. The electronic device 102 respectively establishes Bluetooth connections to the left earbud 101-1 and the right earbud 101-2 of the TWS headset, and transmits data (for example, audio data) based on the respective Bluetooth connections. In this embodiment of this application, structures of the left earbud 101-1 and the right earbud 101-2 of the TWS headset may be shown in FIG. 2, and are described in detail in the following embodiment.

In some embodiments, the electronic device 102 may be a mobile phone (as shown in FIG. 1), a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)/virtual reality (virtual reality, VR) device, a media player, a television, or the like. A specific form of the device is not particularly limited in this embodiment of this application. In this embodiment of this application, a structure of the electronic device 102 may be shown in FIG. 4, and is described in detail in the following embodiment.

Figure 2:
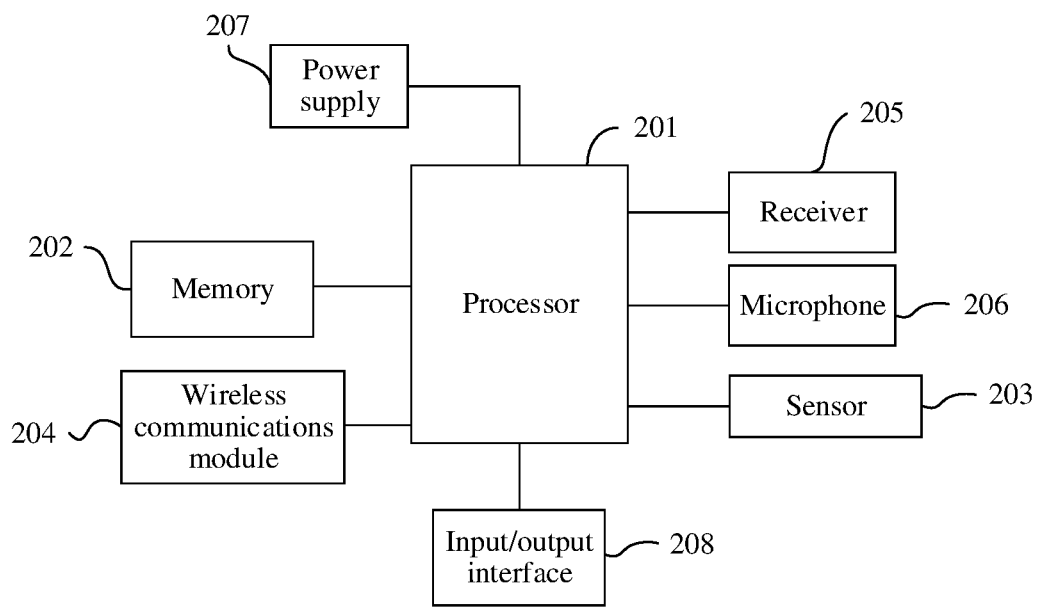
FIG. 2 is a schematic structural diagram of an earbud of a TWS headset according to an embodiment of this application.

FIG. 2 is a schematic structural diagram of an earbud (a left earbud or a right earbud) of a TWS headset according to an embodiment of this application. As shown in FIG. 2, the earbud of the TWS headset may include: a processor 201, a memory 202, a sensor 203, a wireless communications module 204, at least one receiver 205, at least one microphone 206, and a power supply 207.

The memory 202 may be configured to store application program code, for example, application program code used to establish a Bluetooth connection to another earbud of the TWS earphone and enable the earbud to be paired with the electronic device 102. The processor 201 may control execution of the application program code, to implement a function of the earbud of the TWS headset in this embodiment of this application.

The memory 202 may further store a Bluetooth address used to uniquely identify the earbud, and store a Bluetooth address of the other earbud of the TWS headset. In addition, the memory 202 may further store connection data of an electronic device that is successfully paired with the earbud before. For example, the connection data may be a Bluetooth address of the electronic device successfully paired with the earbud. Based on the connection data, the earbud can be automatically paired with the electronic device, and a connection between the earbud and the electronic device does not need to be configured. For example, validity verification is not required. The Bluetooth address may be a media access control (Media Access Control, MAC) address.

The sensor 203 may be a distance sensor or an optical proximity sensor. The processor 201 of the earbud may determine, by using the sensor 203, whether the earbud is worn by the user. For example, the processor 201 of the earbud may detect, by using the optical proximity sensor, whether there is an object near the earbud, to determine whether the earbud is worn by the user. When it is determined that the earbud is worn, the processor 201 of the earbud may start the receiver 205. In some embodiments, the earbud may further include a bone conduction sensor, to form a bone conduction earphone. The bone conduction sensor may obtain a vibration signal of a vibration bone of a sound part, and the processor 201 parses out a speech signal, to implement a control function corresponding to the speech signal. In some other embodiments, the earbud may further include a touch sensor or a pressure sensor, to detect a touch operation or a pressing operation of the user. In some other embodiments, the earbud may further include a fingerprint sensor, configured to detect a user fingerprint, identify a user identity, and the like. In some other embodiments, the earbud may further include an ambient optical sensor, and the processor 201 of the earbud may adaptively adjust some parameters such as volume based on luminance of ambient light sensed by the ambient optical sensor.

The wireless communications module 204 is configured to support short-range data exchange between the left and right earbuds of the TWS headset and between the earbuds and various electronic devices, for example, the electronic device 102. In some embodiments, the wireless communications module 204 may be a Bluetooth transceiver. The earbud of the TWS headset may establish a Bluetooth connection to the electronic device 102 by using the Bluetooth transceiver, to implement short-range data exchange between the earbud of the TWS headset and the electronic device 102.

The receiver 205, also referred to as an "earpiece", may be configured to convert an audio electrical signal into a sound signal and play the sound signal. For example, when the earbud of the TWS headset is used as an audio output device of the electronic device 102, the receiver 205 may convert a received audio electrical signal into a sound signal and play the sound signal.

The microphone 206, also referred to as a "mike" or a "microphone", is configured to convert a sound signal into an audio electrical signal. For example, when the earbud of the TWS headset is used as an audio input device of the electronic device 102, in a process in which the user speaks (for example, makes a call or sends a voice message), the microphone 206 may collect a sound signal of the user and convert the sound signal into an audio electrical signal. The audio electrical signal is the audio data in this embodiment of this application.

The power supply 207 may be configured to supply power to each component included in the earbud of the TWS headset. In some embodiments, the power supply 207 may be a battery, for example, a rechargeable battery.

Figure 3:
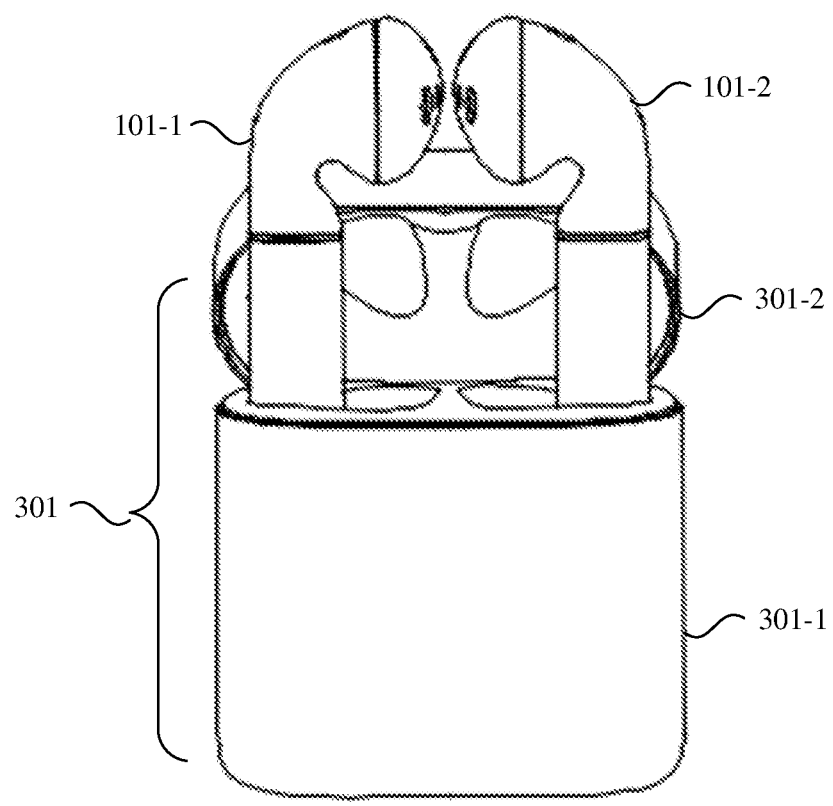
FIG. 3 is a schematic diagram of an example of a product form of a TWS headset according to an embodiment of this application.

Generally, a TWS headset is provided with a headset box (for example, 301 shown in FIG. 3). As shown in FIG. 3, the headset box 301 may include a cavity 301-1 and a box cover 301-2. The cavity 301-1 may be configured to accommodate the left and right earbuds of the TWS headset. With reference to FIG. 1, as shown in FIG. 3, the cavity 301-1 of the headset box 301 may be configured to accommodate the left earbud 101-1 and the right earbud 101-2 of the TWS headset. In addition, the headset box 301 may further charge the left and right earbuds of the TWS headset. Correspondingly, in some embodiments, the earbud of the TWS headset may further include an input/output interface 208.

The input/output interface 208 may be configured to provide any wired connection between the earbud of the TWS headset and the headset box (for example, the cavity 301-1 of the headset box 301). In some embodiments, the input/output interface 208 may be an electrical connector. For example, when the earbud of the TWS headset is placed in the cavity 301-1 of the headset box 301, the earbud of the TWS headset may be electrically connected to the headset box 301 (for example, an input/output interface of the headset box 301) through the electrical connector. After the electrical connection is established, the headset box 301 may charge the power supply 207 of the earbud of the TWS headset. After the electrical connection is established, the earbud of the TWS headset may further perform data communication with the headset box 301. For example, the processor 201 of the earbud of the TWS headset may receive a pairing instruction from the headset box 301 through the electrical connection. The pairing command is used to instruct the processor 201 of the earbud of the TWS headset to enable the wireless communications module 204, so that the earbud of the TWS headset can be paired with the electronic device 102 by using a corresponding wireless communications protocol (for example, the Bluetooth).

Certainly, the earbud of the TWS headset may alternatively not include the input/output interface 208. In this case, the earbud may implement a charging or data communication function based on the Bluetooth connection established between the earbud and the headset box 301 by using the wireless communications module 204.

In addition, in some embodiments, the headset box (for example, the headset box 301) may further include components such as a processor and a memory. The memory may be configured to store application program code, and the application program code is executed under control of the processor of the headset box 301, to implement a function of the headset box 301. For example, when the user opens the box cover 301-2 of the headset box 301, the processor of the headset box 301 may send, by executing the application program code stored in the memory, a pairing command and the like to the earbud of the TWS headset in response to the operation of opening the box cover 301-2 by the user.

It may be understood that the structure shown in this embodiment of this application does not constitute a specific limitation on the earbud of the TWS headset. The CPE 100 may have more or fewer components than those shown in FIG. 2, or may combine two or more components, or may have different component configurations. For example, the earbud may further include components such as an indicator (which may indicate a status such as a battery level of the earbud) and a dust filter (which may be used with the earpiece). Various components shown in FIG. 2 may be implemented in hardware, software, or a combination of hardware and software that includes one or more signal processing or application-specific integrated circuits.

It should be noted that structures of the left and right earbuds of the TWS headset may be the same. For example, both the left and right earbuds of the TWS headset may include the components shown in FIG. 2. Alternatively, the structures of the left and right earbuds of the TWS headset may be different. For example, one earbud (for example, the right earbud) of the TWS headset may include the components shown in FIG. 2, and the other earbud (for example, the left earbud) may include components other than the microphone 206 in FIG. 2.

Figure 4:
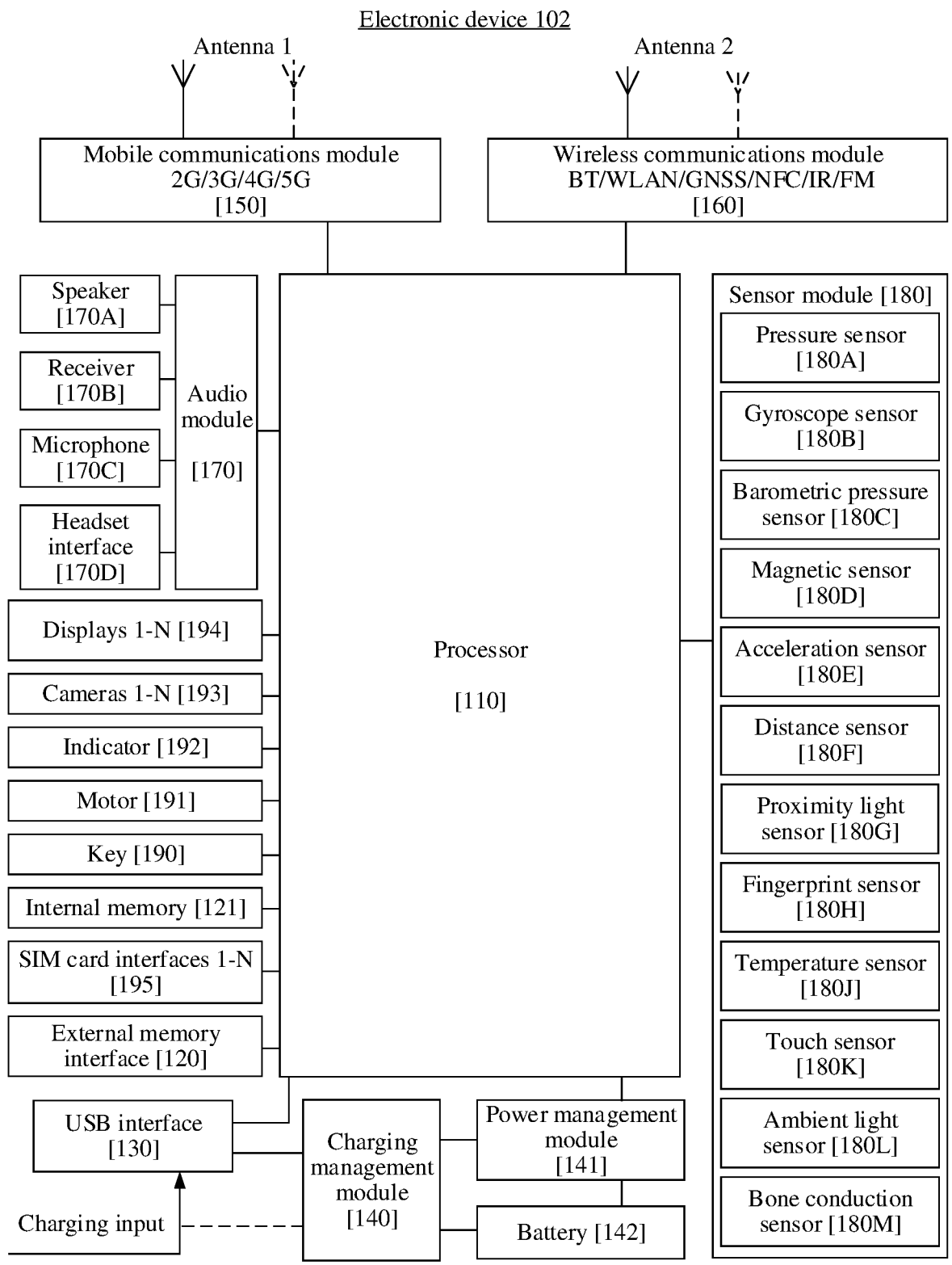
FIG. 4 is a schematic structural diagram of an electronic device according to an embodiment of this application.

FIG. 4 is a schematic structural diagram of an electronic device 102 in a Bluetooth audio system shown in FIG. 1 according to an embodiment of this application. As shown in FIG. 4, the electronic device 102 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in the embodiments of this application does not constitute a specific limitation on the electronic device 102. In some other embodiments, the electronic device 102 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural network processing unit (neural-network processing unit, NPU). Different processing units may be independent components, or may be integrated into one or more processors.

The controller may be a nerve center and a command center of the electronic device 102. The controller may generate an operation control signal based on instruction operation code and a time sequence signal, to complete control of instruction reading and instruction execution.

A memory may further be disposed in the processor 110, and is configured to store instructions and data. In some embodiments, the memory in the processor 110 is a cache memory. The memory may store instructions or data just used or cyclically used by the processor 110.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules shown in this embodiment is merely an example for description, and does not constitute a limitation on the structure of the electronic device 102. In some other embodiments, the electronic device 102 may alternatively use an interface connection manner different from that in the foregoing embodiment, or a combination of a plurality of interface connection manners.

The charging management module 140 is configured to receive a charging input from the charger. The charging management module 140 supplies power to the electronic device through the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 102 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. The mobile communications module 150 may provide a solution that is for wireless communication including 2G/3G/4G/5G and the like and that is applied to the electronic device 102. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. In some embodiments, the modem processor may be an independent component. In some other embodiments, the modem processor may be independent of the processor 110, and is disposed in a same device as the mobile communications module 150 or another function module.

The wireless communications module 160 may provide wireless communication solutions, applied to the electronic device 102, for example, wireless local area network (wireless local area networks, WLAN) (such as a wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), and infrared (infrared, IR) technologies. The wireless communications module 160 may be one or more devices that integrate at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 102 is coupled to the mobile communications module 150, and the antenna 2 is coupled to the wireless communications module 160, so that the electronic device 102 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite based augmentation systems, SBAS). For example, in this embodiment of this application, the electronic device 102 may establish a Bluetooth connection to the peripheral device through the wireless communications module 160 by using the wireless communications technology such as the Bluetooth (BT). Based on the established Bluetooth connection, the electronic device 102 may send voice data to the peripheral device, and may further receive voice data from the peripheral device.

The electronic device 102 implements a display function through the GPU, the display 194, the application processor, and the like. The GPU is a microprocessor for image processing, and connects the display 194 to the application processor. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 102 may include one or N displays 194, where N is a positive integer greater than 1.

The electronic device 102 may implement a photographing function through the ISP, the camera 193, the video codec, the GPU, the display 194, the application processor, and the like.

The ISP is configured to process data fed back by the camera 193. In some embodiments, the ISP may be disposed in the camera 193. The camera 193 is configured to capture a static image or a video. In some embodiments, the electronic device 102 may include one or N cameras 193, where N is a positive integer greater than 1. The video codec is configured to compress or decompress a digital video. The electronic device 102 may support one or more video codecs.

The external memory interface 120 may be configured to connect to an external memory card, for example, a micro SD card, to extend a storage capability of the electronic device 102. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121 to execute various function applications of the electronic device 102 and data processing. For example, in this embodiment of this application, the processor 110 may execute the instructions stored in the internal memory 121, to establish the Bluetooth connection with the peripheral device through the wireless communications module 160, and perform short-range data exchange with the peripheral device, to implement functions such as calling and music playing by using the peripheral device. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 102, and the like. In addition, the internal memory 121 may include a high-speed random access memory, or may include a non-volatile memory such as at least one magnetic disk storage device, a flash storage device, or a universal flash storage (universal flash storage, UFS). In this embodiment of this application, after the Bluetooth connection is established between the electronic device 102 and the peripheral device by using the wireless communications technology such as the Bluetooth, the electronic device 102 may store a Bluetooth address of the peripheral device in the internal memory 121. In some embodiments, when the peripheral device is a device including two main bodies, for example, a TWS headset, and left and right earbuds of the TWS headset have respective Bluetooth addresses, the electronic device 102 may store the Bluetooth addresses of the left and right earbuds of the TWS headset in the internal memory 121 in an associated manner.

The electronic device 102 may implement audio functions, for example, music playback and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 102 may listen to music or answer a hands-free call through the speaker 170A.

The receiver 170B, also referred to as an "earpiece", is configured to convert an audio electrical signal into a sound signal. When a call is answered or voice information is received by using the electronic device 102, the receiver 170B may be put close to a human ear to receive a voice.

The microphone 170C, also referred to as a "mike" or a "microphone", is configured to convert a sound signal into an electrical signal. When making a call or sending voice information, a user may make a sound near the microphone 170C, to input a sound signal to the microphone 170C. At least one microphone 170C may be disposed in the electronic device 102. In some other embodiments, two microphones 170C may be disposed in the electronic device 102, to implement a noise reduction function, in addition to collecting a sound signal. In some other embodiments, three, four, or more microphones 170C may alternatively be disposed in the electronic device 102, to collect a sound signal and reduce noise. The microphones may further identify a sound source, to implement a directional recording function, and the like.

In this embodiment of this application, when the Bluetooth connection is established between the electronic device 102 and the peripheral device, for example, the TWS headset, the TWS headset may be used as an audio input/output device of the electronic device 102. For example, the audio module 170 may receive an audio electrical signal transmitted by the wireless communications module 160, to implement functions such as call answering and music playing by using the TWS headset. For example, in a process in which the user makes a call, the TWS headset may collect a sound signal of the user, convert the sound signal into an audio electrical signal, and send the audio electrical signal to the wireless communications module 160 of the electronic device 102. The wireless communications module 160 transmits the audio electrical signal to the audio module 170. The audio module 170 may convert the received audio electrical signal into a digital audio signal, encode the digital audio signal, and then transfer an encoded digital audio signal to the mobile communications module 150. The mobile communications module 150 transmits the encoded digital audio signal to a peer device of the call, to implement the call. For another example, when the user plays music by using the media player of the electronic device 102, the application processor may transmit, to the audio module 170, an audio electrical signal corresponding to the music played by the media player. The audio module 170 transmits the audio electrical signal to the wireless communications module 160. The wireless communications module 160 may send the audio electrical signal to the TWS headset, so that the TWS headset converts the audio electrical signal into a sound signal for playing.

The headset jack 170D is configured to connect to a wired headset. The headset jack 170D may be the USB interface 130, or may be a 3.5-mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. When a force is applied to the pressure sensor 180A, capacitance between electrodes changes. The electronic device 102 determines pressure intensity based on a capacitance change. When a touch operation is performed on the display 194, the electronic device 102 detects intensity of the touch operation by using the pressure sensor 180A. The electronic device 102 may further calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on an SMS message application icon, an instruction for creating a new SMS message is executed.

The gyroscope sensor 180B may be configured to determine a motion posture of the electronic device 102. The gyroscope sensor 180B may be further used in navigation and motion-sensing game scenarios. The barometric pressure sensor 180C is configured to measure barometric pressure. The magnetic sensor 180D includes a Hall sensor. The acceleration sensor 180E may detect accelerations in various directions (usually on three axes) of the electronic device 102. The distance sensor 180F is configured to measure a distance. The electronic device 102 may detect, by using the optical proximity sensor 180G, that the user holds the electronic device 102 close to an ear for a call, to automatically turn off a screen for power saving. The optical proximity sensor 180G may also be used in a smart cover mode or a pocket mode to automatically unlock or lock the screen. The ambient light sensor 180L is configured to sense ambient light brightness. The ambient light sensor 180L may also be configured to automatically adjust white balance during photographing. The ambient light sensor 180L may further cooperate with the optical proximity sensor 180G to detect whether the electronic device 102 is in a pocket, to avoid an accidental touch. The fingerprint sensor 180H is configured to collect a fingerprint. The electronic device 102 may use a feature of the collected fingerprint to implement fingerprint-based unlocking, application lock access, fingerprint-based photographing, fingerprint-based call answering, and the like. The temperature sensor 180J is configured to detect a temperature. The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device 102 at a position different from that of the display 194. The bone conduction sensor 180M may obtain a vibration signal. The bone conduction sensor 180M may also be in contact with a human pulse, to receive a blood pressure beating signal. The application processor may parse heart rate information based on the blood pressure beating signal obtained by the bone conduction sensor 180M, to implement a heart rate detection function.

The buttons 190 include a power button, a volume button, and the like. The button 190 may be a mechanical button, or may be a touch button. The electronic device 102 may receive a key input, and generate a key signal input related to a user setting and function control of the electronic device 102. The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted in the SIM card interface 195 or removed from the SIM card interface 195, to implement contact with or separation from the electronic device 102. The electronic device 102 may support one or N SIM card interfaces, where N is a positive integer greater than 1. The electronic device 102 interacts with a network by using the SIM card, to implement functions such as calling and data communication.

Figure 5:
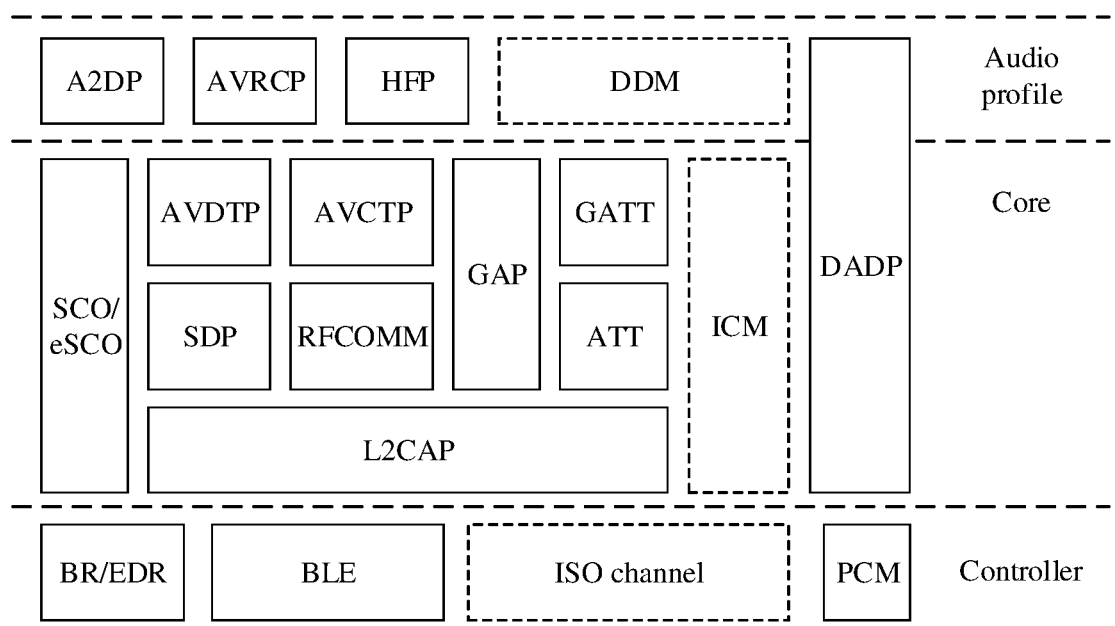
FIG. 5 is a schematic diagram of an audio transmission framework according to an embodiment of this application.

FIG. 5 is a schematic diagram of an audio transmission framework according to an embodiment of this application. The audio transmission framework is applied to a Bluetooth device. The Bluetooth device may be the electronic device 102, for example, a mobile phone. Alternatively, the Bluetooth device may be the peripheral device 101, for example, a TWS headset. The audio transmission framework may be separately applied to left and right earbuds of the TWS headset to implement wireless communication with another Bluetooth device that uses the audio transmission framework, for example, the electronic device 102.

The following describes the audio transmission framework in detail. As shown in FIG. 5, the audio transmission framework may include three layers: an audio profile (Audio profile) layer, a core (core) layer, and a controller (controller) layer.

The audio profile layer may include an A2DP, an AVRCP, an HFP, and a dual device manager (dual device manager, DDM).

Descriptions of the A2DP, the AVRCP, and the HFP are respectively the same as descriptions of the A2DP, the AVRCP, and the HFP in the foregoing embodiments. In addition, in the audio transmission framework provided in this embodiment of this application, the A2DP, the AVRCP, and the HFP are audio profiles supporting BLE. These audio profiles supporting BLE can enable point-to-multipoint data transmission between the electronic device 102 and the two bodies of the peripheral device 101. In addition, these audio profiles supporting BLE can enable synchronization of point-to-multipoint control data between the electronic device 102 and the two bodies of the peripheral device 101.

The DDM may be configured to manage a related procedure of point-to-multipoint data transmission between the electronic device 102 and the peripheral device 101. For example, the related procedure may include: a pairing connection procedure between the electronic device 102 and the peripheral device 101, where the electronic device 102 may separately pair up with and connect to the two bodies (for example, left and right earbuds of a TWS headset) of the peripheral device 101; a primary-secondary switchover procedure (or referred to as a role switchover procedure), where the electronic device 102 may define roles of the two bodies of the peripheral device 101, for example, the peripheral device 101 is a TWS headset, the electronic device 102 may respectively define a left or right earbud of the TWS headset as a primary earbud or a secondary earbud, and the roles of the left and right earbuds may need to be switched subsequently; an audio capability declaration and discovery procedure, where the electronic device 102 and the peripheral device 101 can implement communication based on a corresponding audio profile only when a same audio profile is supported, and the audio capability declaration and discovery procedure may support audio capability negotiation between the electronic device 102 and the peripheral device 101; an audio data configuration procedure; a device scheduling and coordination procedure; an encoder parameter negotiation procedure; a state machine management procedure; a transmission configuration parameter negotiation procedure, where the electronic device 102 and the peripheral device 101 may configure, by using the transmission configuration parameter negotiation procedure, a channel required for transmitting audio data, for example, an ISO channel; and a content control management procedure, where control data may be exchanged between the electronic device 102 and the peripheral device 101 by using the content control management procedure.

The core layer may include: synchronous connection-oriented/extended synchronous connection-oriented (synchronous connection-oriented/extended SCO, SCO/eSCO), an audio/video distribution transport protocol (audio/video distribution transport protocol, AVDTP), an audio/video control transport protocol (audio/video control transport protocol, AVCTP), a service discovery protocol (service discovery protocol, SDP), a radio frequency communications protocol (radio frequency communications protocol, RFCOMM), a generic access profile (generic access profile, GAP), a generic attribute profile (generic attribute profile, GATT), an attribute protocol (attribute protocol, ATT), a logical link control and adaptation protocol (logical link control and adaptation protocol, L2CAP), and an isochronous channel manager (isochronous channel manager, ICM).

SCO/eSCO is a connection-oriented synchronous transmission link based on a BR/an EDR, and can serve a logical link (logical link) of audio data at the BR/EDR.

The AVDTP is a protocol used to describe audio/video transmission between Bluetooth devices, which is a basic protocol of the A2DP.

The AVCTP describes a format and a mechanism for audio/video control data exchange between Bluetooth devices. The AVCTP specifies only a general format of control data and responses (response). A specific format of the control data is implemented by a protocol (such as the AVRCP) specified by the AVCTP.

The SDP may be used as a basis of all profiles. Any Bluetooth profile is implemented based on some services. In a Bluetooth wireless communications system, any two or more devices between which a Bluetooth connection is established may start to communicate at any time. For communication between these devices, the SDP may provide a manner of dynamically querying for a profile supported by a device. Based on the SDP, a device can obtain information and a service type of a peer device through dynamic query to establish a communication channel corresponding to a required service.

The RFCOMM provides a serial emulation interface (serial emulation API), which includes emulation of data signal lines and non-data signal lines. The RFCOMM can emulate a plurality of serial ports between two devices and support emulation of a plurality of serial port between a plurality of devices, and also provides emulation of modems.

The GAP is a basis of a Bluetooth profile, which ensures that different Bluetooth devices can discover each other and establish a connection. The GAP may be used to process some general-mode services (such as inquiry, naming, and search) and some security issues (such as guarantee), and may also be used to process some connection-related services (such as link setup and channel and connection establishment).

The GATT is constructed based on the ATT and establishes some common operations and frameworks for the attribute protocol to transfer and store data.

The ATT is a basis of the GATT and the GAP, and defines a data structure and an organization mode of an upper layer of BLE. An attribute (attribute) concept is the core of the ATT. The ATT defines content of an attribute and specifies a method and a permission to access the attribute.

The L2CAP is an adaptation protocol that shields a baseband protocol for a higher-layer protocol, which is located above the baseband protocol and belongs to a data link layer. The L2CAP may provide connection-oriented and connectionless data services for a higher layer, and implement functions such as protocol multiplexing, segmentation and reassembly, quality of service (quality of service, QoS) transmission, and group abstraction.

The ICM may be configured to establish, reconfigure, and delete an ISO channel for carrying audio data. The ICM may further provide the DDM with all management methods for a data transmission related procedure, for example, defining a specific command and response, and providing an interface for the DDM to use. For example, the ICM may provide the DDM with definitions of specific commands and responses required to manage the pairing connection procedure.

The controller layer may include: a BR/an EDR, BLE, an ISO channel (channel), and pulse code modulation (pulse code modulation, PCM).

In this embodiment of this application, the ISO channel is a BLE-based ISO channel, which can cooperate with the audio profile supporting BLE, to implement point-to-multipoint data transmission and implement rendering synchronization of audio data between the bodies (for example, the left and right earbuds of the TWS headset) of the peripheral device 101.

PCM is a modulation mode used for transmitting audio data. For example, after being received by the mobile communications module of the mobile phone, audio data in a call process may be transmitted to the wireless communications module of the mobile phone, for example, a Bluetooth chip, after PCM processing. Then, the Bluetooth chip transmits the audio data by using 2.4 G to the peripheral device, such as the earbuds of the TWS headset.

As shown in FIG. 5, the audio transmission framework may further include a direct audio data path (direct audio data path, DADP). The DADP belongs to the audio profile layer and the core layer. The DADP may be configured to provide a function of managing direct data. For example, the DADP provides processing such as audio encoding, audio decoding, data distribution, data collection, and synchronous playing of audio data transmitted on BLE-based ISO channels.

In this embodiment of this application, based on the audio transmission framework, point-to-multipoint data transmission can be implemented between the electronic device 102 and the peripheral device 101 by using an audio profile supporting BLE, such as the A2DP, the AVRCP, and the HFP, in cooperation with the DDM. The electronic device 102 may respectively send audio data to the two bodies (for example, the left and right earbuds of the TWS headset) of the peripheral device 101 through ISO channels created by the ICM, and rendering synchronization of the audio data can be implemented between the two bodies of the peripheral device 101. Processing such as encoding and decoding of the audio data may be completed by the DADP. In addition, with the audio profile supporting BLE, synchronization of control data can also be implemented between the electronic device 102 and the two bodies of the peripheral device 101.

Figure 6:
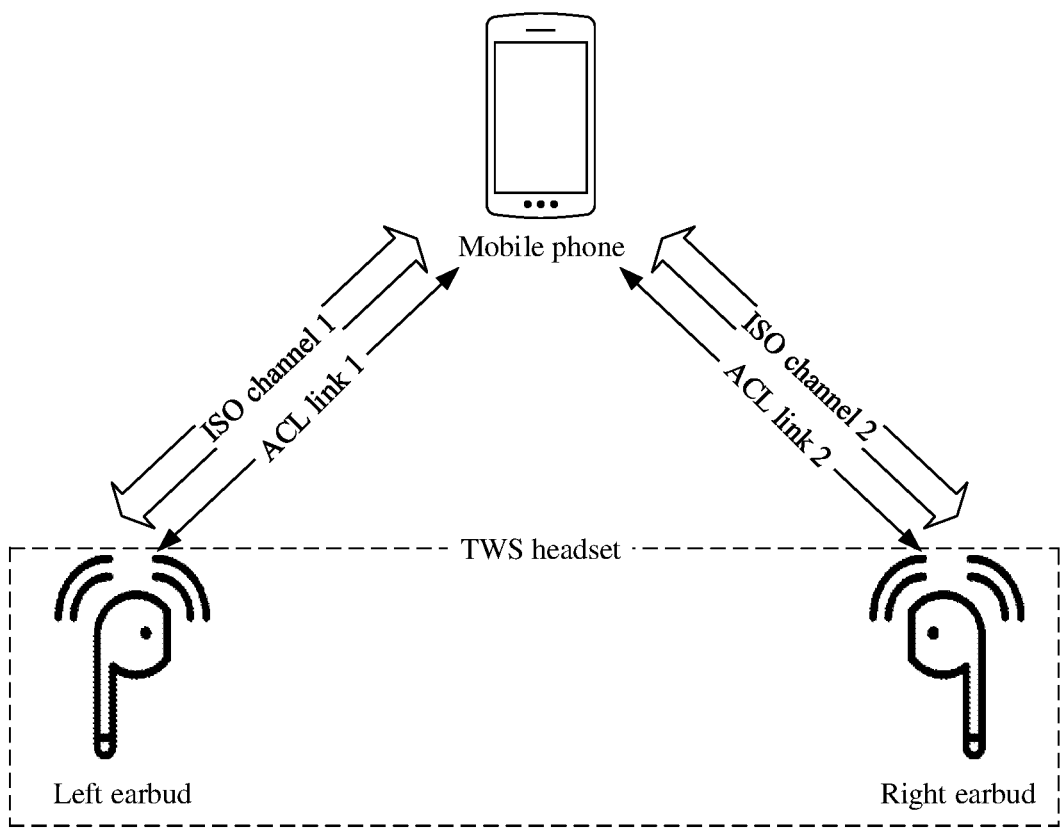
FIG. 6 is a schematic diagram of a communications system between a mobile phone and a TWS headset according to an embodiment of this application.

For ease of understanding, the following describes in detail the point-to-multipoint data transmission method provided in the embodiments of this application with reference to accompanying drawings. Referring to FIG. 6, the following embodiments are all described by using an example in which the electronic device is a mobile phone, the peripheral device is a TWS headset, and the TWS headset includes a left earbud and a right earbud. The left earbud may be a first earbud in this application, and the right earbud may be a second earbud in this application. Alternatively, the left earbud may be a second earbud in this application, and the right earbud may be a first earbud in this application.

The left earbud and the right earbud of the TWS headset may separately pair up with the mobile phone.

For example, when a user wants to use the TWS headset, the user may open a cover of a headset box of the TWS headset. The left and right earbuds of the TWS headsets automatically start, or the user presses a function key to start the earbuds. If the left and right earbuds have not completed pairing before, the left and right earbuds may automatically perform pairing, or the left and right earbuds may perform pairing after the user presses a pairing function key. If the left and right earbuds have completed pairing, the pairing process can be omitted. Then, either (such as the right earbud) of the left earbud and the right earbud of the TWS headset may send a pairing broadcast. If a Bluetooth function on the mobile phone has been enabled, the mobile phone may receive the pairing broadcast and inform the user that a related Bluetooth device (such as the TWS headset) has been obtained through scanning. After the user selects the TWS headset as a to-be-connected device, the mobile phone may pair up with the right earbud of the TWS headset.

After the right earbud pairs up with the mobile phone, the right earbud may send a Bluetooth address of the mobile phone to the left earbud by using a Bluetooth connection between the right earbud and the left earbud, and notify the left earbud to send a pairing broadcast. In this way, the mobile phone may receive the pairing broadcast sent by the left earbud and pair up with the left earbud.

The right earbud of the TWS headset may further send a Bluetooth address of the left earbud to the mobile phone, to indicate to the mobile phone that the left earbud and the right earbud are two bodies of a same peripheral device. When audio data needs to be transmitted to the left and right earbuds of the TWS headset subsequently, the mobile phone may respectively transmit the audio data to the right earbud and the left earbud based on ISO channels of BLE, to implement rendering synchronization of the audio data between the right earbud and the left earbud.

It should be noted that the foregoing process of pairing up with the mobile phone by the left earbud and the right earbud of the TWS headset is merely an example. In some embodiments, the mobile phone may alternatively pair up with the left earbud of the TWS headset first, and then the left earbud sends the Bluetooth address of the mobile phone to the right earbud, and notifies the right earbud to send a pairing broadcast, so that the right earbud pairs up with the mobile phone. In some other embodiments, when the cover of the headset box of the TWS headset is opened, the left earbud and the right earbud of the TWS headset may each send a pairing broadcast after starting, so that the left earbud and the right earbud can each pair up with the mobile phone. In addition, a trigger condition for the left earbud or the right earbud of the TWS headset to send a pairing broadcast may be that the cover of the headset box of the TWS headset is opened or the pairing function key is pressed, as described in the foregoing embodiment, or may be another trigger condition. The pairing function key may be disposed on the headset box of the TWS headset. For example, the pairing function key is configured on the headset box of the TWS headset. When the pairing function key is pressed, the left earbud or the right earbud of the TWS headset may send a pairing broadcast. The pairing function key may also be disposed on the left and right earbuds of the TWS headset. For example, the pairing function key is disposed on the left earbud and/or the right earbud of the TWS headset. When the pairing function key is pressed, a corresponding earbud sends a pairing broadcast.

After pairing up with the left earbud and the right earbud of the TWS headset, the mobile phone may separately perform service content negotiation with the left earbud and the right earbud.

For example, the mobile phone performs service content negotiation with the left earbud. The mobile phone may send an SDP service request to the left earbud to obtain a service type supported by the left earbud. After receiving the SDP service request, the left earbud returns the service type supported by the left earbud to the mobile phone. Similarly, the mobile phone may perform service content negotiation with the right earbud, to obtain a service type supported by the right earbud. For example, in this embodiment of this application, the mobile phone, the left earbud, and the right earbud may support BLE-based audio profiles such as the HFP, the A2DP, and the AVRCP. By using these BLE-based audio profiles, point-to-multipoint data transmission between the mobile phone and the left and right earbuds of the TWS headset can be implemented.

After the mobile phone pairs up with the left earbud and the right earbud of the TWS headset, the mobile phone may further set up ACL links to the left earbud and the right earbud respectively.

For example, as shown in FIG. 6, the mobile phone may set up an ACL link 1 to the left earbud, and the mobile phone may set up an ACL link 2 to the right earbud. The ACL link 1 may be a first ACL link in this application. The ACL link 2 may be a second ACL link in this application. For example, the mobile phone sets up the ACL link 1 to the left earbud. The mobile phone may send an ACL link setup request to the left earbud. The left earbud makes a response after receiving the ACL link setup request. After the mobile phone receives the response from the left earbud, the ACL link 1 is set up successfully.

The mobile phone may configure respective ISO channels by using the ACL links to the left and right earbuds of the TWS headset.

For example, as shown in FIG. 6, the mobile phone may configure an ISO channel 1 between the mobile phone and the left earbud by using the ACL link 1 and configure an ISO channel 2 between the mobile phone and the right earbud by using the ACL link 2. The ISO channel 1 may be a first ISO channel in this application. The ISO channel 2 may be a second ISO channel in this application.

For example, the mobile phone configures the ISO channel 1 between the mobile phone and the left earbud by using the ACL link 1. The mobile phone may send, to the left earbud of the TWS headset over the ACL link 1, a request (request) message carrying a parameter required for configuring the ISO channel 1. After receiving the request message, the left earbud may return a response (response) message to the mobile phone, to acknowledge to the mobile phone that the parameter required for configuring the ISO channel 1 has been received. After receiving the response message, the mobile phone may send an indication (indication, IND) message to the left earbud. In this way, the mobile phone may configure the ISO channel 1 to the left earbud based on the corresponding parameter.

After the mobile phone and the left and right earbuds of the TWS headset configure the respective ISO channels, with the BLE-based audio profiles obtained after the negotiation and the configured ISO channels, point-to-multipoint data transmission between the mobile phone and the left and right earbuds of the TWS headset can be implemented, and rendering synchronization of audio data between the right earbud and the left earbud can be implemented. In addition, synchronization of control data between the mobile phone and the left and right earbuds of the TWS headset can also be implemented.

The following describes a point-to-multipoint data transmission process between the mobile phone and the left and right earbuds of the TWS headset by using specific examples.

For example, with reference to FIG. 5 and FIG. 6, the TWS headset is used as an audio output device of the mobile phone to play music. When the user opens the media player in the mobile phone to play music, the mobile phone may encode audio data corresponding to the music played by the media player, and then separately send the encoded audio data to the left and right earbuds of the TWS headset.

Figure 7:
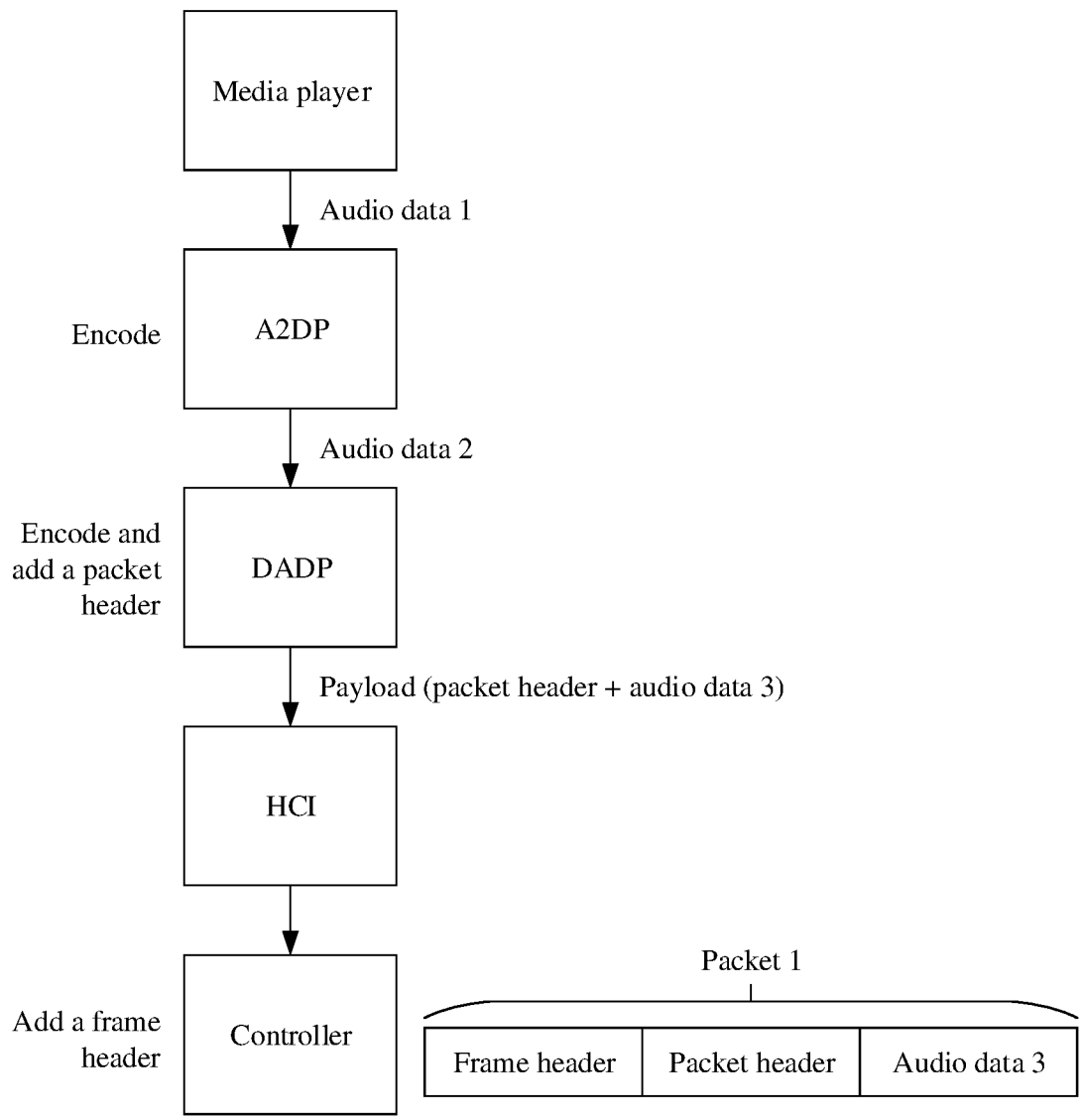
FIG. 7 is a schematic diagram of an encoding framework according to an embodiment of this application.

In some embodiments, referring to FIG. 7, a process in which the mobile phone encodes audio data may specifically include the following steps.

The media player of the mobile phone may transmit audio data (for example, referred to as audio data 1) corresponding to the currently played music to the audio profile layer.

The DDM at the audio profile layer may encode the audio data 1 with reference to a BLE-based audio profile, that is, the A2DP. For example, audio data 2 is obtained after the audio data 1 is encoded. The DDM transmits the audio data 2 to the DADP. For a specific implementation of encoding the audio data 1 based on the A2DP by the DDM, refer to an existing implementation of encoding audio data based on the A2DP. Details are not described herein in this embodiment of this application.

The DADP encodes the received audio data 2. For example, audio data 3 is obtained after the audio data 2 is encoded. The DADP adds a packet header to the audio data 3, to package the audio data 3 into a payload (payload) in a "packet header+audio data" format. In this embodiment of this application, the packet header may include the following fields: a serial number (Serial Number, SN), a timestamp (timestamp), and a payload length (payload length). The payload length is a length of the audio data 3. The SN and the payload length may be used to determine whether a packet loss occurs in packets. When a packet loss occurs, the SN and the payload length may be further used for corresponding packet loss compensation. The timestamp may be used for a receiving device (such as the left and right earbuds of the TWS headset) to determine a time for playing the audio data. The timestamp may be a first timestamp in this application.

The DADP transmits the packaged payload to the controller layer by using a host controller interface protocol (Host Controller Interface Protocol, HCI). The HCI is a layer protocol located between the core layer and the controller layer, which may provide an upper-layer protocol with a unified interface to enter a link layer and a unified manner to enter a baseband. Both the link layer and the baseband may belong to the controller layer.

The controller layer may add a frame header (frame header) to the payload. For example, the frame header may include an access address (access address). The access address may be used to indicate an identity of the receiving device. In some embodiments, the access address may be used to indicate an identity of the left earbud of the TWS headset and an identity of the right earbud. The frame header may further include an identifier or the like used to indicate that the packet is a data packet rather than a control packet. It should be noted that, processing performed by the controller layer on the payload transmitted from the upper layer may include, but is not limited to, the foregoing processing of adding a frame header. For example, the controller layer may further add a frame tail (frame tail) to the payload. The frame trailer may include a check code or the like. For example, the check code may be a cyclic redundancy check (Cyclic Redundancy Check, CRC) 24. The check code may be used to check the packet. For another example, the controller layer may further add a 1-byte preamble (preamble) to the payload, to improve modulation and demodulation efficiency.

After the foregoing layer-by-layer processing is performed, the audio data corresponding to the music currently played by the media player, that is, the audio data 1, is packaged into a packet meeting BLE, for example, referred to as a packet 1. For a data format of the packet 1, refer to FIG. 7 (the frame trailer and the preamble are not shown in FIG. 7). The packet 1 may be a first packet in this application. The mobile phone may respectively send the packet 1 to the left and right earbuds of the TWS headset through the ISO channels. For example, referring to FIG. 6, the mobile phone sends the packet 1 to the left earbud through the ISO channel 1, and sends the packet 1 to the right earbud through the ISO channel 2. In some embodiments, the access address in the frame header added by the controller layer to the payload may alternatively be used to indicate only an identity of one earbud of the TWS headset. In other words, two different access addresses are used to respectively indicate identities of the left and right earbuds of the TWS headset. In this case, the mobile phone may separately encode the audio data that needs to be sent to the left and right earbuds, to generate packets corresponding to the left and right earbuds, and then send the packets to the corresponding earbuds by using respective ISO channels to the left and right earbuds.

It should be noted that the foregoing audio data encoding process is merely an example, and a specific implementation of the process is not limited in this embodiment of this application. In other words, processing such as encoding and adding a packet header to the audio data delivered by the upper-layer application may not be implemented by the corresponding layer in the foregoing example. For example, the processing of encoding the audio data with reference to the A2DP may be implemented by the controller layer instead of the DDM at the audio profile layer.

After the mobile phone sends the packet 1, the left and right earbuds of the TWS headset may separately receive the packet 1 from the mobile phone. The left and right earbuds of the TWS headset may separately decode and play the received packet 1.

In some embodiments, for example, the left earbud of the TWS headset decodes the received packet 1. A specific process in which the left earbud decodes the packet 1 may include the following steps.

After the left earbud of the TWS headset receives the packet 1 through the ISO channel 1, the controller layer of the left earbud may determine, based on the frame header (for example, the access address included in the frame header) in the packet 1, whether the packet 1 is a packet sent to the left earbud. If the packet 1 is a packet sent to the left earbud, the left earbud may continue to perform subsequent processing on the packet 1. If the packet 1 is not a packet sent to the left earbud, the left earbud may discard the received packet 1. The controller layer of the left earbud may further determine, based on a corresponding identifier carried in the frame header of the packet 1, that the packet 1 is a data packet. In addition, the packet 1 may be further checked based on the check code included in the frame trailer of the packet 1, to ensure correctness and integrity of data transmission. After the processing is completed, the controller layer of the left earbud may transmit the payload in the packet 1 to the DADP of the left earbud by using the HCI of the left earbud.

After receiving the payload, the DADP may parse out the packet header and the audio data 3 in the received payload. The DADP may determine, based on the SN and the payload length in the packet header, whether a packet loss occurs in packets. If a packet loss occurs, the DADP may further perform corresponding packet loss compensation based on the SN and the payload length. In addition, the DADP may further determine, based on the timestamp in the packet header, the time for playing the audio data. The DADP may further decode the audio data 3, for example, decode the audio data 3 to obtain the audio data 2. The DADP transmits the audio data 2 obtained through the decoding to the DDM at the audio profile layer of the left earbud.

The DDM decodes the audio data 2 with reference to a BLE-based audio profile obtained after the negotiation, that is, the A2DP, for example, decodes the audio data 2 to obtain the audio data 1.

After the foregoing layer-by-layer processing is performed, the left earbud of the TWS headset may obtain audio data that needs to be played, for example, the audio data 1. Similarly, the right earbud of the TWS headset may also process the received packet 1 to obtain the audio data 1 that needs to be played. In addition, in the foregoing processing process, the left and right earbuds of the TWS headset may further obtain times for playing the audio data. The left and right earbuds of the TWS headset may play the respectively obtained audio data based on the obtained playing times. The times for playing the audio data that are obtained by the left and right earbuds of the TWS headset are the same. In this way, point-to-multipoint data transmission can be implemented between the mobile phone and the left and right earbuds of the TWS headset, and rendering synchronization of the audio data can also be implemented between the left and right earbuds of the TWS headset.

It should be noted that the foregoing example is described by using an example in which the mobile phone sends same audio data, for example, the audio data 1, to the left and right earbuds. For stereo audio data, the mobile phone may send different audio data to the left and right earbuds. For example, the mobile phone sends left channel audio data to the left earbud of the TWS headset, and sends right channel audio data to the right earbud. In this case, the mobile phone may separately encode the audio data that needs to be sent to the left and right earbuds. An encoding process is similar to the encoding process in the foregoing example, and details are not described herein again. This solution of sending the left channel audio data to the left earbud and sending the right channel audio data to the right earbud reduces an amount of data transmitted between devices, as compared with a solution of transmitting the stereo audio data to both the left earbud and the right earbud. For example, for stereo audio data at a bit rate of 300 kbit/second (kbps), in this embodiment of this application, left channel audio data and right channel audio data each at a bit rate of about 150 kbps may be respectively sent to the left and right earbuds of the TWS headset. Compared with separately sending the audio data at the bit rate of 300 kbps to the left and right earbuds, the data transmission is reduced by about half. In addition, because the data received by the left and right earbuds is reduced, radio frequency receivers of the left and right earbuds correspondingly work less. In this way, power consumption of the left and right earbuds can be reduced, and the left and right earbuds can have a longer standby time. Because the audio bit rate of the left and right earbuds decreases, a probability of interference in a radio environment can also be reduced.

In some other embodiments, when the TWS headset is used as an audio output device of the mobile phone to play music, in addition to the audio data, control data of commands such as play and pause may be transmitted between the mobile phone and the TWS headset. In this embodiment of this application, based on the audio transmission framework shown in FIG. 5, synchronization of point-to-multipoint control data can also be implemented between the mobile phone and the left and right earbuds of the TWS headset by using an audio profile supporting BLE. In other words, for the user, the mobile phone can ensure that the left and right earbuds of the TWS headset synchronously play/pause. For example, with reference to FIG. 5 and FIG. 6, the mobile phone currently plays music by using the TWS headset, and the user performs a pause operation on the mobile phone. The mobile phone may receive the pause operation of the user. For example, the pause operation may be a tapping operation performed by the user on a pause button in an interface of the media player displayed on the mobile phone. In response to the pause operation, the mobile phone may separately send a pause command to the left and right earbuds of the TWS headset. Before sending the pause command, the mobile phone may encode the pause command.

Figure 8:
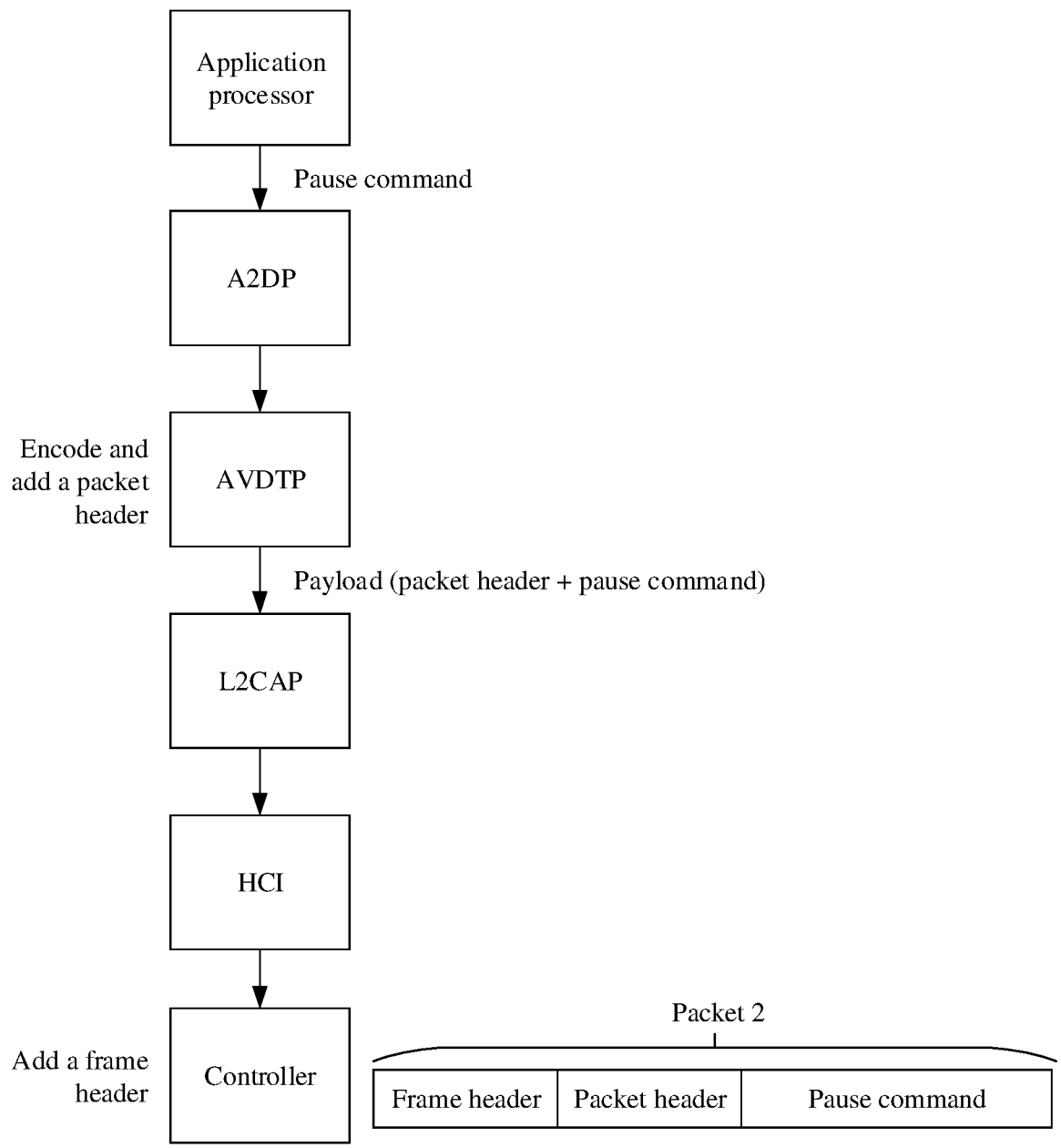
FIG. 8 is a schematic diagram of another encoding framework according to an embodiment of this application.

In some embodiments, referring to FIG. 8, a process in which the mobile phone encodes the pause command may specifically include the following steps.

For example, the pause operation is a tapping operation performed by the user on the pause button in the interface of the media player displayed on the mobile phone. After the mobile phone receives the tapping operation performed by the user on the pause button in the interface of the media player, the application processor of the mobile phone may generate the pause command in response to the tapping operation on the pause button. The application processor of the mobile phone transmits the pause command to the audio profile layer.

The DDM at the audio profile layer may encode the pause command with reference to the A2DP and the AVDTP. The DDM may further add a packet header to the encoded pause command, to package the encoded pause command into a payload (payload) in a "packet header+control data" format.

In this embodiment of this application, the packet header may include a field such as a timestamp (timestamp). The timestamp may be used for a receiving device (such as the left and right earbuds of the TWS headset) to determine a time for executing the control data, that is, determine a time for pausing music playing. The timestamp may be a second timestamp in this application. The DDM sends the packaged payload to the controller layer by using the L2CAP and the HCI. The controller layer may add fields such as a frame header (frame header), a frame tail (frame tail), and a preamble (preamble) to the payload. For the processing of adding a frame header, a frame trailer, and a preamble to the payload by the controller layer, refer to corresponding descriptions in the audio data encoding process in this embodiment of this application. Details are not described herein again.

After the foregoing processing is performed, the pause command is packaged into a packet meeting BLE, for example, referred to as a packet 2. For a format of the packet 2, refer to FIG. 8 (the frame trailer and the preamble are not shown in FIG. 8). The packet 2 may be a second packet in this application. The mobile phone may respectively send the packet 2 to the left and right earbuds of the TWS headset over the ACL links. For example, referring to FIG. 6, the mobile phone sends the packet 2 to the left earbud over the ACL link 1, and sends the packet 2 to the right earbud over the ACL link 2.

It should be noted that the foregoing pause command encoding process is merely an example, and a specific implementation of the process is not limited in this embodiment of this application. In other words, processing such as encoding and adding a packet header to the control data such as the pause command transmitted from the application processor may not be implemented by the corresponding layer in the foregoing example. For example, the processing of encoding the pause command with reference to the A2DP and the AVDTP may be implemented by the controller layer instead of the DDM at the audio profile layer.

After the mobile phone sends the packet 2, the left and right earbuds of the TWS headset may separately receive the packet 2 from the mobile phone. The left and right earbuds of the TWS headset may separately decode the received packet 2 and perform a corresponding operation, for example, pause music playing.

In some embodiments, for example, the left earbud of the TWS headset decodes the received packet 2. A specific process in which the left earbud decodes the packet 2 may include the following steps.

After the left earbud of the TWS headset receives the packet 2 over the ACL link 1, the controller layer of the left earbud may determine, based on the frame header in the packet 2, whether the packet 2 is a packet sent to the left earbud. If the packet 2 is a packet sent to the left earbud, the left earbud may continue to perform subsequent processing on the packet 2. If the packet 2 is not a packet sent to the left earbud, the left earbud may discard the received packet 2. The controller layer of the left earbud may further determine, based on a corresponding identifier carried in the frame header of the packet 2, that the packet 2 is a control packet. In addition, the packet 2 may be further checked based on a check code included in the frame trailer of the packet 2, to ensure correctness and integrity of data transmission. After the processing is completed, the controller layer of the left earbud may transmit the payload in the packet 2 to the audio profile layer of the left earbud by using the HCI and the L2CAP of the left earbud.

The DDM at the audio profile layer may parse the received payload with reference to the A2DP and the AVDTP. The DDM may parse out the packet header and the encoded pause command in the payload. The DDM may determine, based on the timestamp in the packet header, a time for executing the pause command. The DDM may further decode the encoded pause command to obtain the pause command.

After the foregoing layer-by-layer processing is performed, the left earbud of the TWS headset may obtain control data that needs to be executed, that is, the pause command. Similarly, the right earbud of the TWS headset may also process the received packet 2 to obtain the pause command. In addition, in the foregoing processing process, the left and right earbuds of the TWS headset may further obtain times for executing the pause command. The left and right earbuds of the TWS headset may respond to the obtained pause command based on the obtained times. The times for executing the pause command that are obtained by the left and right earbuds of the TWS headset are the same. In this way, synchronization of point-to-multipoint control data is implemented between the mobile phone and the left and right earbuds of the TWS headset. In other words, for the user, the mobile phone can control the left and right earbuds of the TWS headset to simultaneously pause music playing.

It should be noted that the foregoing example is described by using an example in which the user triggers a pause of music playing on the mobile phone. In some other embodiments, the user may alternatively trigger a pause of music playing on the TWS headset. For example, the left earbud of the TWS headset includes a touch sensor, and the user may perform a double-tap operation at a corresponding position of the touch sensor in the left earbud, to trigger a pause of music playing. After the left earbud of the TWS headset receives the operation, in response to the operation, the left earbud of the TWS headset may generate a pause command and send the pause command to the mobile phone. After receiving the pause command, the mobile phone may perform the foregoing encoding process to obtain a packet 2 and send the packet 2 to the left and right earbuds of the TWS headset, to implement synchronization of pauses of the left and right earbuds of the TWS headset in user perception. In addition, an implementation of synchronization of other control data such as a play command is similar to an implementation process of synchronization of the pause command in the foregoing example. Details are not described herein in this embodiment of this application.

For another example, with reference to FIG. 5 and FIG. 6, the TWS headset is used as an audio input/output device of the mobile phone to implement a call. During a call, the mobile phone may encode voice data sent by a peer call device and then send the encoded voice data to the left and right earbuds of the TWS headset.

Figure 9:
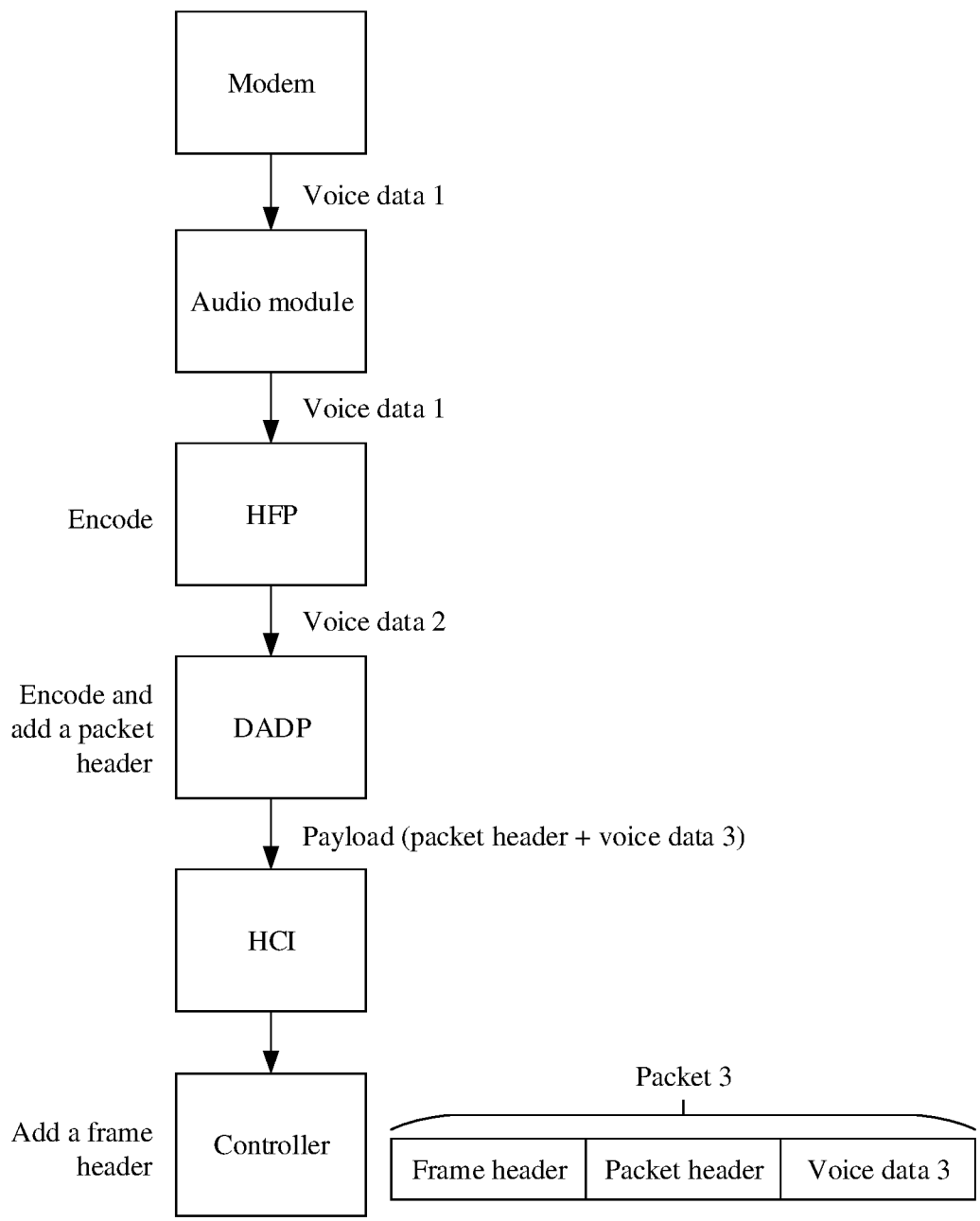
FIG. 9 is a schematic diagram of still another encoding framework according to an embodiment of this application.

In some embodiments, referring to FIG. 9, a process in which the mobile phone encodes voice data may specifically include the following steps.

When the mobile phone performs a voice or video call with the peer call device, when receiving voice data sent by the peer call device, for example, referred to as voice data 1, the mobile communications module of the mobile phone may transmit the voice data 1 to the audio profile layer by using a modem and the audio module of the mobile phone.

The DDM at the audio profile layer may encode the voice data 1 with reference to a BLE-based audio profile, that is, the HFP. For example, voice data 2 is obtained after the voice data 1 is encoded. The DDM transmits the voice data 2 to the DADP. For a specific implementation of encoding the voice data 1 based on the HFP by the DDM, refer to an existing implementation of encoding voice data based on the HFP. Details are not described herein in this embodiment of this application.

The DADP encodes the received voice data 2. For example, voice data 3 is obtained after the voice data 2 is encoded. The DADP adds a packet header to the voice data 3, to package the voice data 3 into a payload (payload) in a "packet header+audio data" format. The packet header may include the following fields: an SN, a timestamp (timestamp), and a payload length (payload length). The payload length is a length of the voice data 3. The SN and the payload length may be used to determine whether a packet loss occurs in packets. When a packet loss occurs, the SN and the payload length may be further used for corresponding packet loss compensation. The timestamp may be used for a receiving device (such as the left and right earbuds of the TWS headset) to determine a time for playing the voice data. The timestamp may be a first timestamp in this application.

The DADP transmits the packaged payload to the controller layer by using the HCI. The controller layer may add fields such as a frame header (frame header), a frame tail (frame tail), and a preamble (preamble) to the payload. For the processing of adding a frame header, a frame trailer, and a preamble to the payload by the controller layer, refer to corresponding descriptions in the audio data encoding process in this embodiment of this application. Details are not described herein again.

After the foregoing processing is performed, the voice data received by the mobile phone from the peer call device, that is, the voice data 1, is packaged into a packet 3 meeting BLE. For a data format of the packet 3, refer to FIG. 9 (the frame trailer and the preamble are not shown in FIG. 9). The packet 3 may be a first packet in this application. The mobile phone may respectively send the packet 3 to the left and right earbuds of the TWS headset through the ISO channels. For example, referring to FIG. 6, the mobile phone sends the packet 3 to the left earbud through the ISO channel 1, and sends the packet 3 to the right earbud through the ISO channel 2.

It should be noted that the foregoing voice data encoding process is merely an example, and a specific implementation of the process is not limited in this embodiment of this application. In other words, processing such as encoding and adding a packet header to the voice data transmitted from the audio module may not be implemented by the corresponding layer in the foregoing example. For example, the processing of encoding the voice data with reference to the HFP may be implemented by the controller layer instead of the DDM at the audio profile layer. For another example, the processing of adding a packet header to the voice data may be implemented by the controller layer instead of the DADP. In some other embodiments, the audio module may alternatively directly transmit the voice data to the controller layer. The controller layer may not perform processing such as encoding or adding a packet header to the received voice data, but adds fields such as a frame header and a frame tail, and then respectively sends the voice data to the left and right earbuds of the TWS headset through the ISO channels. The left and right earbuds of the TWS headsets may separately play the voice data immediately after receiving the voice data, to implement rendering synchronization.

After the mobile phone sends the packet 3, the left and right earbuds of the TWS headset may separately receive the packet 3 from the mobile phone. The left and right earbuds of the TWS headset may separately decode and play the received packet 3.

In some embodiments, for example, the left earbud of the TWS headset decodes the received packet 3. A specific process in which the left earbud decodes the packet 3 may include the following steps.

After the left earbud of the TWS headset receives the packet 3 through the ISO channel 1, the controller layer of the left earbud may determine, based on the frame header in the packet, whether the packet 3 is a packet sent to the left earbud. If the packet 3 is a packet sent to the left earbud, the left earbud may continue to perform subsequent processing on the packet 3. If the packet 3 is not a packet sent to the left earbud, the left earbud may discard the received packet 3. The controller layer of the left earbud may further determine, based on the frame header of the packet 3, that the packet 3 is a data packet. In addition, the packet 3 may be further checked based on the frame trailer in the packet 3, to ensure correctness and integrity of data transmission. After the processing is completed, the controller layer of the left earbud may transmit the payload in the packet 3 to the DADP by using the HCI of the left earbud.

After receiving the payload, the DADP may parse out the packet header and the voice data 3 in the payload. The DADP may determine, based on the SN and the payload length in the packet header, whether a packet loss occurs in packets. If a packet loss occurs, the DADP may further perform corresponding packet loss compensation based on the SN and the payload length. In addition, the DADP may further determine, based on the timestamp in the packet header, the time for playing the voice data. The DADP may further decode the voice data 3, for example, decode the voice data 3 to obtain the voice data 2. The DADP transmits the decoded voice data 2 to the DDM at the audio profile layer of the left earbud.

The DDM decodes the voice data 2 with reference to an audio profile obtained after the negotiation, that is, the HFP, for example, decodes the voice data 2 to obtain the voice data 1.

After the foregoing processing is performed, the left earbud of the TWS headset may obtain voice data that needs to be played, for example, the voice data 1. Similarly, the right earbud of the TWS headset may also process the received packet 3 to obtain the voice data 1 that needs to be played. In addition, in the foregoing processing process, the left and right earbuds of the TWS headset may further obtain times for playing the voice data. The left and right earbuds of the TWS headset may play the respectively obtained voice data based on the obtained playing times. The times for playing the voice data that are obtained by the left and right earbuds of the TWS headset are the same. In this way, point-to-multipoint data transmission can be implemented between the mobile phone and the left and right earbuds of the TWS headset, and rendering synchronization of the voice data can also be implemented between the left and right earbuds of the TWS headset.

In some other embodiments, when the TWS headset is used as an audio input/output device of the mobile phone to implement a call, when the user speaks, an earbud (for example, the left earbud) of the TWS headset may collect a sound signal of the user by using a microphone of the earbud. The left earbud may convert the collected sound signal into voice data, encode the voice data, and transmit the data to the mobile phone. After receiving the data sent by the left earbud of the TWS headset, the mobile phone may perform decoding processing to obtain the voice data that needs to be sent to a peer call device. In some embodiments, a specific process in which the left earbud encodes the voice data may be as follows: After collecting the sound signal and converting the sound signal into the voice data, the microphone of the left earbud may transmit the voice data to the audio profile layer of the left earbud. The DDM at the audio profile layer may encode the voice data with reference to the HFP, and then transmit the encoded voice data to the controller layer by using the HCI. The controller layer may add fields such as a frame header, a frame trailer, and a preamble to the encoded voice data, to package the encoded voice data into a packet, and transmit the packet to the mobile phone through the ISO channel 1. A specific process in which the mobile phone decodes the received packet may be as follows: After the mobile phone receives the packet, the controller layer of the mobile phone may perform corresponding processing on the packet based on the frame header, the frame trailer, and the preamble of the packet, for example, determine whether the packet is a packet sent to the mobile phone, and check the packet. After the processing is completed, a payload field in the packet is transmitted to the audio profile layer by using the HCI. The DDM at the audio profile layer may decode the encoded voice data in the payload with reference to the HFP, to obtain the voice data. After obtaining the voice data, the mobile phone may transmit the voice data to the peer call device.

In some other embodiments, when the TWS headset is used as an audio input/output device of the mobile phone to implement a call, in addition to the voice data, control data of commands such as answering an incoming call, hanging up a call, rejecting an incoming call, voice dialing, holding a call, and callback may be transmitted between the mobile phone and the TWS headset. In this embodiment of this application, based on the audio transmission framework shown in FIG. 5, synchronization of point-to-multipoint control data can also be implemented between the mobile phone and the left and right earbuds of the TWS headset by using an audio profile supporting BLE. In other words, for the user, the mobile phone can ensure that the left and right earbuds of the TWS headset synchronously answer/hang up a call or the like. For example, with reference to FIG. 5 and FIG. 6, the mobile phone currently implements a call by using the TWS headset, and the user performs an operation of hanging up the call on the mobile phone. The mobile phone may receive the operation of hanging up the call by the user. For example, the operation of hanging up the call may be a tapping operation performed by the user on a hang-up button in a call interface displayed on the mobile phone. In response to the operation of hanging up the call, the mobile phone may separately send a hang-up command to the left and right earbuds of the TWS headset. In addition, the mobile phone may further transmit the hang-up command to a peer call device to end the call. Before sending the hang-up command, the mobile phone may encode the hang-up command.

Figure 10:
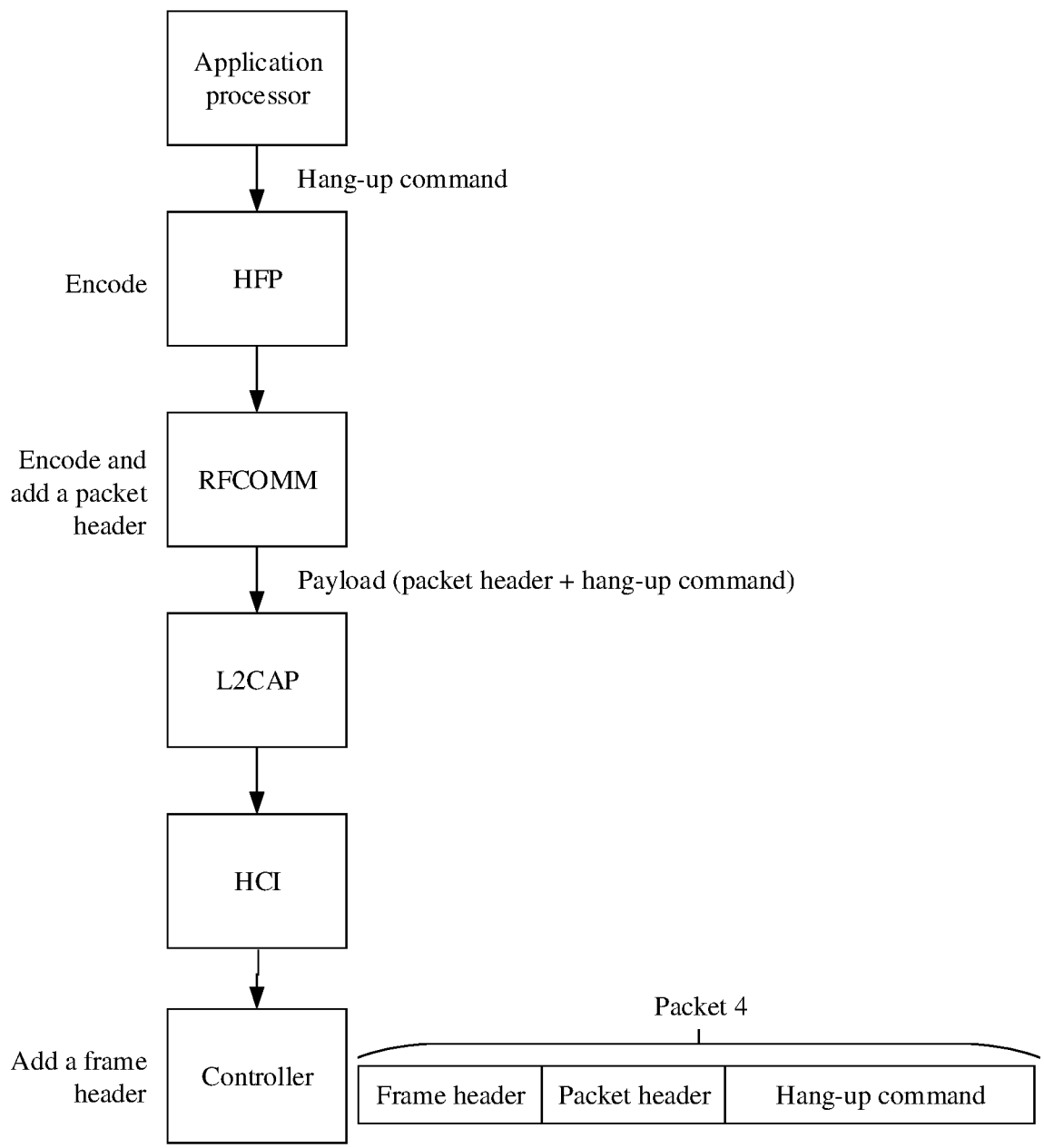
FIG. 10 is a schematic diagram of still another encoding framework according to an embodiment of this application.

In some embodiments, referring to FIG. 10, a process in which the mobile phone encodes the hang-up command may specifically include the following steps.

For example, the operation of hanging up the call is a tapping operation performed by the user on the hang-up button in the call interface displayed on the mobile phone. After the mobile phone receives the tapping operation performed by the user on the hang-up button in the call interface, the application processor of the mobile phone may generate the hang-up command in response to the tapping operation on the hang-up button. The application processor of the mobile phone transmits the hang-up command to the audio profile layer.

The DDM at the audio profile layer may encode the hang-up command with reference to the HFP, and transmit the encoded hang-up command to the RFCOMM. The RFCOMM may add a packet header to the encoded hang-up command, to package the encoded hang-up command into a payload (payload) in a "packet header+control data" format.

In this embodiment of this application, the packet header may include a field such as a timestamp (timestamp). The timestamp may be used for a receiving device (such as the left and right earbuds of the TWS headset) to determine a time for executing the control data, that is, determine a time for ending the call. The timestamp may be a second timestamp in this application. The RFCOMM sends the packaged payload to the controller layer by using the L2CAP and the HCI. The controller layer may add fields such as a frame header, a frame tail, and a preamble to the payload. For the processing of adding a frame header, a frame trailer, and a preamble to the payload by the controller layer, refer to corresponding descriptions in the audio data encoding process in this embodiment of this application. Details are not described herein again.

After the foregoing processing is performed, the hang-up command is packaged into a packet meeting BLE, for example, referred to as a packet 4. For a format of the packet 4, refer to FIG. 10 (the frame trailer and the preamble are not shown in FIG. 1). The packet 4 may be a second packet in this application. The mobile phone may respectively send the packet 4 to the left and right earbuds of the TWS headset over the ACL links. For example, referring to FIG. 6, the mobile phone sends the packet 4 to the left earbud over the ACL link 1, and sends the packet 4 to the right earbud over the ACL link 2.

It should be noted that the foregoing hang-up command encoding process is merely an example, and a specific implementation of the process is not limited in this embodiment of this application. In other words, processing such as encoding and adding a packet header to the control data such as the hang-up command transmitted from the application processor may not be implemented by the corresponding layer in the foregoing example. For example, the processing of encoding the hang-up command with reference to the HFP may not be implemented by the DDM at the audio profile layer, and the processing of adding a packet header may not be implemented by the RFCOMM, but both are implemented by the controller layer.

After the mobile phone sends the packet 4, the left and right earbuds of the TWS headset may separately receive the packet 4 from the mobile phone. The left and right earbuds of the TWS headset may separately decode the received packet 4 and perform a corresponding operation, for example, ending the call, to stop voice data playing and stop voice data collection.

In some embodiments, for example, the left earbud of the TWS headset decodes the received packet 4. A specific process in which the left earbud decodes the packet 4 may include the following steps.

After the left earbud of the TWS headset receives the packet 4 over the ACL link 1, the controller layer of the left earbud may perform corresponding processing on the packet 4 based on the frame header, the frame trailer, and the preamble in the packet 4, for example, determine whether the packet 4 is a packet sent to the left earbud, and check the packet 4. After the processing is completed, the controller layer of the left earbud may transmit the payload in the packet 4 to the audio profile layer of the left earbud by using the HCI and the L2CAP of the left earbud.

The RFCOMM at the audio profile layer may parse the received payload. The RFCOMM may parse out the packet header and the encoded hang-up command in the payload. The RFCOMM may determine, based on the timestamp in the packet header, a time for executing the hang-up command, that is, determine a time for ending the call. The RFCOMM may further transmit the obtained encoded hang-up command to the DDM. The DDM may decode the encoded hang-up command to obtain the hang-up command.

After the foregoing processing is performed, the left earbud of the TWS headset may obtain control data that needs to be executed, that is, the hang-up command. Similarly, the right earbud of the TWS headset may also process the received packet 4 to obtain the hang-up command. In addition, in the foregoing processing process, the left and right earbuds of the TWS headset may further obtain times for executing the hang-up command. The left and right earbuds of the TWS headset may respond to the obtained hang-up command based on the obtained times. The times for executing the hang-up command that are obtained by the left and right earbuds of the TWS headset are the same. In this way, synchronization of point-to-multipoint control data is implemented between the mobile phone and the left and right earbuds of the TWS headset. In other words, for the user, the mobile phone can control the left and right earbuds of the TWS headset to simultaneously end the call, to stop voice data playing and stop voice data collection.

It should be noted that the foregoing example is described by using an example in which the user triggers, on the mobile phone, the current call to be ended. In some other embodiments, the user may alternatively trigger, on the TWS headset, the current call to be ended. For example, the right earbud of the TWS headset includes a touch sensor, and the user may perform a tapping operation at a corresponding position of the touch sensor in the right earbud, to trigger the mobile phone to end the current call. After the right earbud of the TWS headset receives the operation, in response to the operation, the right earbud of the TWS headset may generate a hang-up command and send the hang-up command to the mobile phone. After receiving the hang-up command, the mobile phone may perform the foregoing encoding process to obtain a packet 4 and send the packet 4 to the left and right earbuds of the TWS headset, to implement synchronization of ending the call by the left and right earbuds of the TWS headset in user perception. In addition, an implementation of synchronization of other control data such as answering a call or rejecting an incoming call is similar to an implementation process of synchronization of hanging up a call in the foregoing example. For example, when receiving an incoming call, the mobile phone may send an answering command to the left and right earbuds of the TWS headset, so that the left and right earbuds of the TWS headset can simultaneously play a ringtone of the mobile phone or a local ringtone of the earbuds. For another example, after the user performs dialing, the mobile phone may send a dialing command to the left and right earbuds of the TWS headset, so that the left and right earbuds of the TWS headset can simultaneously play a ringback tone. Details are not described in this embodiment of this application.

In some other embodiments, when the TWS headset is used as an audio output device of the mobile phone to play music, or is used as an audio input/output device of the mobile phone to implement a call, in addition to the audio data, control data of commands such as volume up and volume down may be transmitted between the mobile phone and the TWS headset. In this embodiment of this application, based on the audio transmission framework shown in FIG. 5, synchronization of point-to-multipoint control data can also be implemented between the mobile phone and the left and right earbuds of the TWS headset by using an audio profile supporting BLE. In other words, for the user, the mobile phone can ensure that the left and right earbuds of the TWS headset synchronously turn up/down the volume. For example, with reference to FIG. 5 and FIG. 6, the mobile phone currently plays music by using the TWS headset, and the user turns up the volume on the mobile phone. The mobile phone may receive a volume-up operation of the user. For example, the volume-up operation may be an operation performed by the user on a volume adjustment button in the interface of the media player displayed on the mobile phone. In response to the volume-up operation, the mobile phone may separately send a volume-up command to the left and right earbuds of the TWS headset. Before sending the volume-up command, the mobile phone may encode the volume-up command.

Figure 11:
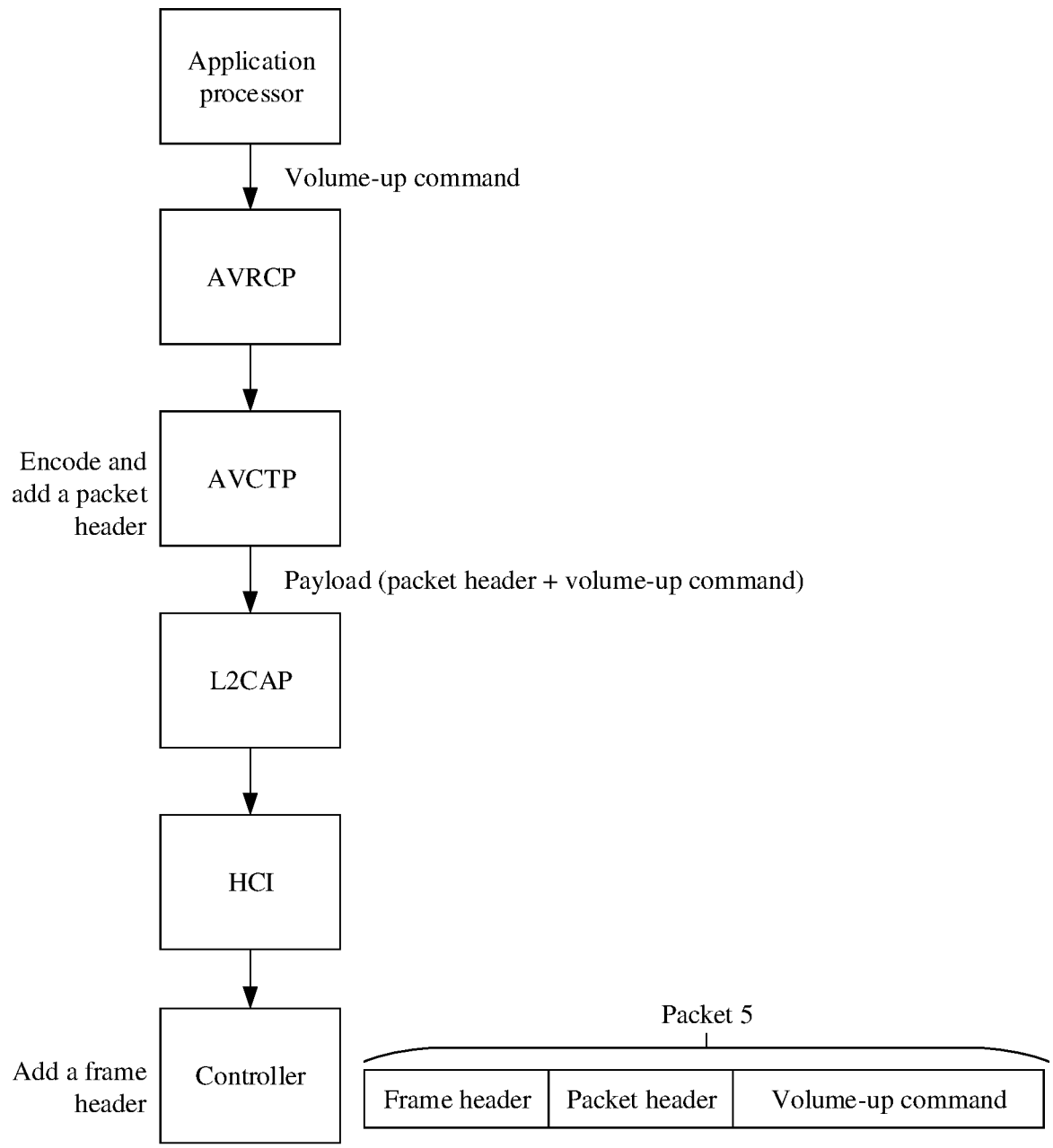
FIG. 11 is a schematic diagram of still another encoding framework according to an embodiment of this application.

In some embodiments, referring to FIG. 11, a process in which the mobile phone encodes the volume-up command may specifically include the following steps.

For example, the volume-up operation is an operation performed by the user on the volume adjustment button in the interface of the media player displayed on the mobile phone. After the mobile phone receives the tapping operation performed by the user on the volume adjustment button in the interface of the media player, the application processor of the mobile phone may generate the volume-up command in response to the operation. The application processor of the mobile phone transmits the volume-up command to the audio profile layer.

The DDM at the audio profile layer may encode the volume-up command with reference to the AVRCP and the AVDTP. The DDM may further add a packet header to the encoded volume-up command, to package the encoded volume-up command into a payload (payload) in a "packet header+control data" format.

In this embodiment of this application, the packet header may include a field such as a timestamp (timestamp). The timestamp may be used for a receiving device (such as the left and right earbuds of the TWS headset) to determine a time for executing the control data, that is, determine a time for turning up the volume. The timestamp may be a second timestamp in this application. The DDM sends the packaged payload to the controller layer by using the L2CAP and the HCI. The controller layer may add fields such as a frame header, a frame tail, and a preamble to the payload. For the processing of adding a frame header, a frame trailer, and a preamble to the payload by the controller layer, refer to corresponding descriptions in the audio data encoding process in this embodiment of this application. Details are not described herein again.

After the foregoing processing is performed, the volume-up command is packaged into a packet meeting BLE, for example, referred to as a packet 5. For a format of the packet 5, refer to FIG. 11 (the frame trailer and the preamble are not shown in FIG. 11). The packet 5 may be a second packet in this application. The mobile phone may respectively send the packet 5 to the left and right earbuds of the TWS headset over the ACL links. For example, referring to FIG. 6, the mobile phone sends the packet 5 to the left earbud over the ACL link 1, and sends the packet 5 to the right earbud over the ACL link 2.

It should be noted that the foregoing volume-up command encoding process is merely an example, and a specific implementation of the process is not limited in this embodiment of this application. In other words, processing such as encoding and adding a packet header to the control data such as the volume-up command transmitted from the application processor may not be implemented by the corresponding layer in the foregoing example. For example, the processing of encoding the volume-up command with reference to the AVRCP and the AVDTP may be implemented by the controller layer instead of the DDM at the audio profile layer.

After the mobile phone sends the packet 5, the left and right earbuds of the TWS headset may separately receive the packet 5 from the mobile phone. The left and right earbuds of the TWS headset may separately decode the received packet 5 and perform a corresponding operation, for example, turn up the volume.

In some embodiments, for example, the left earbud of the TWS headset decodes the received packet 5. A specific process in which the left earbud decodes the packet 5 may include the following steps.

After the left earbud of the TWS headset receives the packet 5 over the ACL link 1, the controller layer of the left earbud may perform corresponding processing on the packet 5 based on the frame header, the frame trailer, and the preamble in the packet 5, for example, determine whether the packet 5 is a packet sent to the left earbud, and check the packet 5. After the processing is completed, the controller layer of the left earbud may transmit the payload in the packet 5 to the audio profile layer of the left earbud by using the HCI and the L2CAP of the left earbud.

The DDM at the audio profile layer may parse the received payload with reference to the AVRCP and the AVDTP. The DDM may parse out the packet header and the encoded volume-up command in the payload. The DDM may determine, based on the timestamp in the packet header, a time for executing the volume-up command. The DDM may further decode the encoded volume-up command to obtain the volume-up command.

After the foregoing processing is performed, the left earbud of the TWS headset may obtain control data that needs to be executed, that is, the volume-up command. Similarly, the right earbud of the TWS headset may also process the received packet 5 to obtain the volume-up command. In addition, in the foregoing processing process, the left and right earbuds of the TWS headset may further obtain times for executing the volume-up command. The left and right earbuds of the TWS headset may turn up the volume based on the obtained times. The times for executing the volume-up command that are obtained by the left and right earbuds of the TWS headset are the same. In this way, synchronization of point-to-multipoint control data is implemented between the mobile phone and the left and right earbuds of the TWS headset. In other words, for the user, the mobile phone can control the left and right earbuds of the TWS headset to simultaneously turn up the volume.

It should be noted that the foregoing example is described by using an example in which the user adjusts the volume on the mobile phone. In some other embodiments, the user may alternatively adjust the volume on the TWS headset. For example, the left earbud of the TWS headset includes a touch sensor, and the user may perform a sliding operation at a corresponding position of the touch sensor in the left earbud, to adjust the volume. After the left earbud of the TWS headset receives the operation, in response to the operation, the left earbud of the TWS headset may generate a volume-up command and send the volume-up command to the mobile phone. After receiving the volume-up command, the mobile phone may perform the foregoing encoding process to obtain a packet 5 and send the packet 5 to the left and right earbuds of the TWS headset, to implement synchronization of volume up of the left and right earbuds of the TWS headset in user perception. In addition, an implementation of synchronization of other control data such as volume down is similar to an implementation process of volume up in the foregoing example. Details are not described herein in this embodiment of this application.

Figure 12:
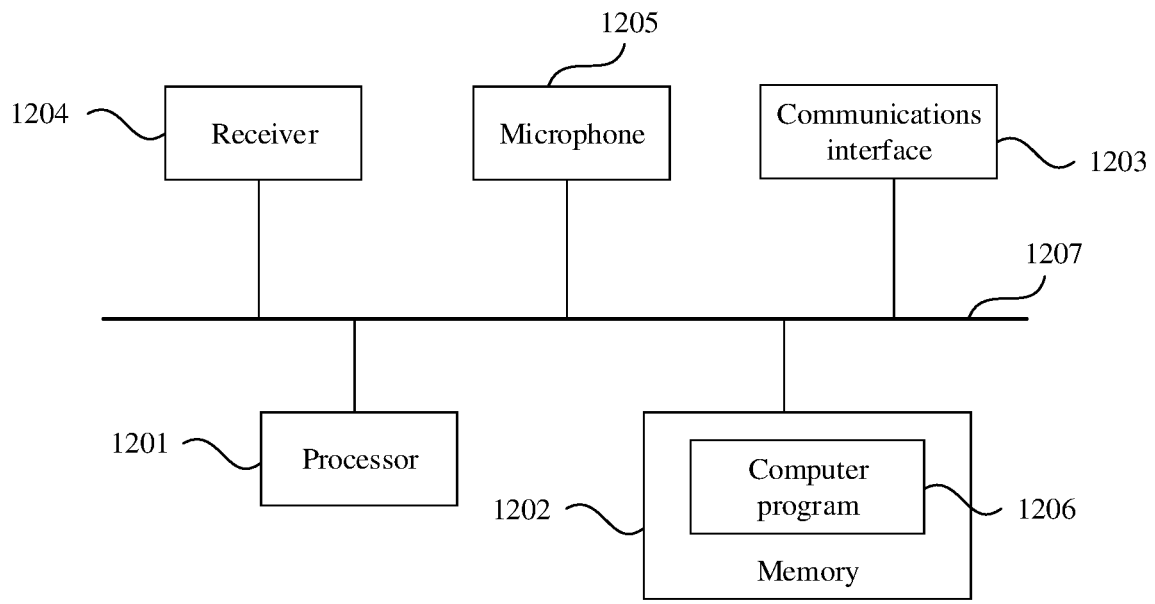
FIG. 12 is a schematic structural diagram of an earbud of another TWS headset according to an embodiment of this application.

Some other embodiments of this application further provide a peripheral device. For example, the peripheral device is a TWS headset. As shown in FIG. 12, an earbud of the TWS headset may include: one or more processors 1201, a memory 1202, a communications interface 1203, a receiver 1204, a microphone 1205, and one or more computer programs 1206. The components may be connected by using one or more communications buses 1207. The one or more computer programs 1206 are stored in the memory 1202, and are configured to be executed by the one or more processors 1201. The one or more computer programs 1206 include instructions, and the instructions may be used to perform steps performed by an earbud (for example, a left earbud and a right earbud) of a TWS headset in the embodiments corresponding to FIG. 6 to FIG. 11. Certainly, the earbud of the TWS headset shown in FIG. 12 may further include another component such as a sensor. This is not limited in this embodiment of this application.

Figure 13:
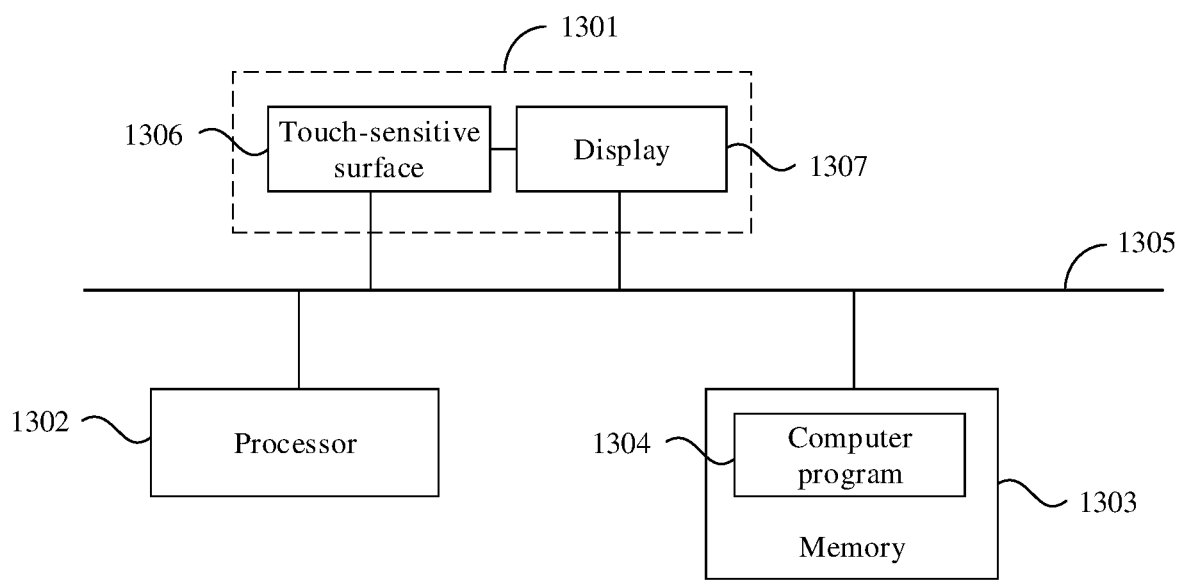
FIG. 13 is a schematic structural diagram of another electronic device according to an embodiment of this application.

Some other embodiments of this application further provide an electronic device. As shown in FIG. 13, the electronic device may include: a touchscreen 1301, where the touchscreen 1301 may include a touch-sensitive surface 1306 and a display 1307; one or more processors 1302; a memory 1303; and one or more computer programs 1304. The components may be connected by using one or more communications buses 1305. The one or more computer programs 1304 are stored in the memory 1303, and are configured to be executed by the one or more processors 1302. The one or more computer programs 1304 include instructions, and the instructions may be used to perform steps performed by an electronic device in the embodiments corresponding to FIG. 6 to FIG. 11. Certainly, the electronic device shown in FIG. 13 may further include another component such as a sensor module, an audio module, and a SIM card interface. This is not limited in this embodiment of this application.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the embodiments of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments, but are not intended to limit the protection scope of the embodiments. Any variation or replacement within the technical scope disclosed in the embodiments shall fall within the protection scope of the embodiments. Therefore, the protection scope of the embodiments shall be subject to the protection scope of the claims.

What is claimed is:

1. A point-to-multipoint data transmission method, comprising:
    separately pairing up, by a first earbud of a true wireless stereo (TWS) headset and a second earbud of the TWS headset, with an electronic device;
    obtaining a service type supported by the electronic device by separately performing, by the first earbud and the second earbud, service content negotiation with the electronic device, wherein the service type supported by the electronic device comprises a Bluetooth low energy (BLE)-based audio profile, and wherein service types supported by the first earbud and the second earbud comprise the BLE-based audio profile;
    receiving, by the first earbud, first configuration information sent by the electronic device, wherein the first configuration information is associated with configuration of a first isochronous ISO channel between the first earbud and the electronic device;
    receiving, by the second earbud, second configuration information sent by the electronic device, wherein the second configuration information is associated with configuration of a second ISO channel between the second earbud and the electronic device;
    receiving, by the first earbud based on the BLE-based audio profile, audio data that is sent by the electronic device through the first ISO channel;
    receiving, by the second earbud based on the BLE-based audio profile, the audio data that is sent by the electronic device through the second ISO channel; and
    playing, by the first earbud and the second earbud, the respectively received audio data based on a first timestamp.

2. The method according to claim 1, further comprising:
    setting up, by the first earbud, a first asynchronous connection-oriented link (ACL) to the electronic device; and
    setting up, by the second earbud, a second ACL link to the electronic device;
    wherein the receiving, the first configuration information sent by the electronic device comprises receiving, by the first earbud, the first configuration information that is sent by the electronic device over the first ACL link; and
    wherein the receiving, by the second earbud, second configuration information sent by the electronic device comprises receiving, by the second earbud, the second configuration information that is sent by the electronic device over the second ACL link.

3. The method according to claim 2, further comprising:
    receiving, by the first earbud based on the BLE-based audio profile, control data that is sent by the electronic device over the first ACL link;
    receiving, by the second earbud based on the BLE-based audio profile, the control data that is sent by the electronic device over the second ACL link; and
    responding, by the first earbud and the second earbud, to the respectively received control data based on a second time stamp.

4. The method according to claim 3, wherein the receiving the control data that is sent by the electronic device over the first ACL link comprises:
    receiving, by the first earbud based on the BLE-based audio profile, a second packet that is sent by the electronic device over the first ACL link, wherein the second packet comprises a second payload, and wherein the second payload comprises the control data and the second time stamp; and
    wherein the receiving, by the second earbud based on the BLE-based audio profile, the control data that is sent by the electronic device over the second ACL link comprises:
        receiving, by the second earbud based on the BLE-based audio profile, the second packet that is sent by the electronic device over the second ACL link.

5. The method according to claim 1, wherein the receiving, by the first earbud based on the BLE-based audio profile, the audio data that is sent by the electronic device through the first ISO channel comprises:
    receiving, by the first earbud based on the BLE-based audio profile, a first packet that is sent by the electronic device through the first ISO channel, wherein the first packet comprises a first payload, and the first payload comprises the audio data and the first timestamp; and
    wherein the receiving, by the second earbud based on the BLE-based audio profile, the audio data that is sent by the electronic device through the second ISO channel comprises:
        receiving, by the second earbud based on the BLE-based audio profile, the first packet that is sent by the electronic device through the second ISO channel.

6. A point-to-multipoint data transmission method, comprising:
- separately pairing up, by an electronic device, with a first earbud and a second earbud of a TWS headset;
- obtaining, by the electronic device, service types supported by the first earbud and the second earbud by separately performing, by the electronic device, service content negotiation with the first earbud and the second earbud, to, wherein the service types supported by the first earbud and the second earbud comprise a Bluetooth low energy BLE-based audio profile, and a service type supported by the electronic device comprises the BLE-based audio profile;
- sending, by the electronic device, first configuration information to the first earbud, wherein the first configuration information is associated with configuration of a first isochronous ISO channel between the electronic device and the first earbud;
- sending, by the electronic device, second configuration information to the second earbud, wherein the second configuration information is associated with configuration of a second ISO channel between the electronic device and the second earbud; and
- sending, by the electronic device based on the BLE-based audio profile, audio data to the first earbud through the first ISO channel, and sending the audio data to the second earbud through the second ISO channel.

7. The method according to claim 6, further comprising:
- setting up, by the electronic device, a first asynchronous connection-oriented link (ACL) to the first earbud; and
- setting up, by the electronic device, a second ACL link to the second earbud;
- wherein the sending, by the electronic device, first configuration information to the first earbud comprises sending, by the electronic device, the first configuration information to the first earbud over the first ACL link; and
- wherein the sending, by the electronic device, second configuration information to the second earbud comprises sending, by the electronic device, the second configuration information to the second earbud over the second ACL link.

8. The method according to claim 7, further comprising:
- sending, by the electronic device based on the BLE-based audio profile, control data to the first earbud over the first ACL link; and
- sending the control data to the second earbud over the second ACL link.

9. The method according to claim 8, wherein the sending, by the electronic device based on the BLE-based audio profile, control data to the first earbud over the first ACL link, and the sending the control data to the second earbud over the second ACL link comprises:
- generating a second packet by encoding, by the electronic device, the control data based on the BLE-based audio profile, wherein the second packet comprises a second payload, wherein the second payload comprises the control data and a second time stamp, and wherein the second time stamp is associated with the first earbud and the second earbud implementing synchronization of the control data;
- sending, by the electronic device, the second packet to the first earbud over the first ACL link; and
- sending, by the electronic device, the second packet to the second earbud over the second ACL link.

10. The method according to claim 6, wherein the sending, by the electronic device based on the BLE-based audio profile, the audio data to the first earbud through the first ISO channel, and sending the audio data to the second earbud through the second ISO channel comprises:
- generating, by the electronic device, a first packet by encoding the audio data based on the BLE-based audio profile, wherein the first packet comprises a first payload, wherein the first payload comprises the audio data and a first timestamp, and wherein the first timestamp is used for the first earbud and the second earbud to implement rendering synchronization of the audio data;
- sending, by the electronic device, the first packet to the first earbud through the first ISO channel; and
- sending, by the electronic device, the first packet to the second earbud through the second ISO channel.

11. A true wireless stereo TWS headset, comprising:
a first earbud; and
a second earbud;
wherein the first earbud and the second earbud each comprise:
- a processor;
- a non-transitory memory;
- a wireless communications module;
- a receiver; and
- a microphone;

wherein the memory, the wireless communications module, the receiver, and the microphone are coupled to the processor;
wherein the non-transitory memory is stores computer program code for execution by the processor;
wherein the computer program code of the first earbud includes computer instructions for:
- pairing up with an electronic device;
- obtaining a service type supported by the electronic device by performing service content negotiation with the electronic device, wherein the service type supported by the electronic device comprises a Bluetooth low energy (BLE)-based audio profile, and wherein a service type supported by the first earbud comprises the BLE-based audio profile;
- receiving first configuration information sent by the electronic device, wherein the first configuration information is associated with a first isochronous (ISO) channel between the first earbud and the electronic device;
- receiving audio data that is sent by the electronic device through the first ISO channel based on the BLE-based audio profile; and
- playing the received audio data based on a first timestamp; and wherein the computer program code of the second earbud includes computer instructions for:
- pairing up with the electronic device;
- obtaining the service type supported by the electronic device by performing service content negotiation with the electronic device, wherein the service type supported by the electronic device comprises a BLE-based audio profile, and wherein a service type supported by the second earbud comprises the BLE-based audio profile;
- receiving second configuration information sent by the electronic device, wherein the second configuration information is used to configure a second isochronous (ISO) channel between the second earbud and the electronic device;
- receiving audio data that is sent by the electronic device through the second ISO channel based on the BLE-based audio profile; and playing the received audio data based on the first timestamp.

12. The TWS headset according to claim 11, wherein the computer program code of the first earbud further includes computer instructions for:
- setting up a first asynchronous connection-oriented link (ACL) to the electronic device;
- wherein the computer instructions that are of the computer program code of the first earbud and that are for the receiving the first configuration information sent by the electronic device include computer instructions for:
  - receiving the first configuration information that is sent by the electronic device over the first ACL link; and
- wherein the computer program code of the second earbud further includes computer instructions for:
  - setting up a second ACL link to the electronic device; and
- wherein the computer instructions that are of the computer program code of the first earbud and that are for the receiving the second configuration information sent by the electronic device include computer instructions for:
  - receiving the second configuration information that is sent by the electronic device over the second ACL link.

13. The TWS headset according to claim 12, wherein the computer program code of the first earbud further includes computer instructions for:
- receiving control data that is sent by the electronic device over the first ACL link based on the BLE-based audio profile; and
- responding to the received control data based on a second time stamp; and
- wherein the computer program code of the second earbud further includes computer instructions for:
  - receiving control data that is sent by the electronic device over the second ACL link based on the BLE-based audio profile; and
  - responding to the received control data based on the second time stamp.

14. The TWS headset according to claim 13, wherein the computer instructions that are of the computer program code of the first earbud and that are for the receiving the control data that is sent by the electronic device over the first ACL link based on the BLE-based audio profile include computer instructions for:
- receiving a second packet that is sent by the electronic device over the first ACL link based on the BLE-based audio profile, wherein the second packet comprises a second payload, and the second payload comprises the control data and the second time stamp; and
- wherein the computer instructions that are of the computer program code of the first earbud and that are for the receiving the control data that is sent by the electronic device over the second ACL link based on the BLE-based audio profile include computer instructions for:
  - receiving the second packet that is sent by the electronic device over the second ACL link based on the BLE-based audio profile.

15. The TWS headset according to claim 11, wherein the computer instructions that are of the computer program code of the first earbud and that are for the receiving the audio data that is sent by the electronic device through the first ISO channel based on the BLE-based audio profile include computer instructions for:
- receiving a first packet that is sent by the electronic device through the first ISO channel based on the BLE-based audio profile, wherein the first packet comprises a first payload, and the first payload comprises the audio data and the first timestamp; and
- wherein the computer instructions that are of the computer program code of the first earbud and that are for the receiving the audio data that is sent by the electronic device through the second ISO channel based on the BLE-based audio profile include computer instructions for:
  - receiving the first packet that is sent by the electronic device through the second ISO channel based on the BLE-based audio profile.

* * * * *